United States Patent
Bouchon et al.

(10) Patent No.: US 10,776,679 B2
(45) Date of Patent: Sep. 15, 2020

(54) DEVICE AND METHOD FOR OPTICALLY ENCODING AN IMAGE

(71) Applicant: Office National d'Etudes et de Recherches Aérospatiales, Palaiseau (FR)

(72) Inventors: Patrick Bouchon, Verrières-le-Buisson (FR); Julien Jaeck, Massy (FR); Mathilde Makhsiyan, La Boisse (FR); Riad Haïdar, Paris (FR)

(73) Assignee: Office National d'Etudes et de Recherches Aérospatiales-ONERA, Palaiseau (FR)

( * ) Notice: Subject to any disclaimer, the term of this patent is extended or adjusted under 35 U.S.C. 154(b) by 268 days.

(21) Appl. No.: 15/746,916

(22) PCT Filed: Jul. 5, 2016

(86) PCT No.: PCT/EP2016/065877
§ 371 (c)(1),
(2) Date: Jan. 23, 2018

(87) PCT Pub. No.: WO2017/012862
PCT Pub. Date: Jan. 26, 2017

(65) Prior Publication Data
US 2020/0082234 A1    Mar. 12, 2020

(30) Foreign Application Priority Data

Jul. 23, 2015    (FR) ...................................... 15 57021

(51) Int. Cl.
*G06K 19/06* (2006.01)
*B42D 25/305* (2014.01)
(Continued)

(52) U.S. Cl.
CPC ..... *G06K 19/06037* (2013.01); *B42D 25/305* (2014.10); *B42D 25/36* (2014.10);
(Continued)

(58) Field of Classification Search
CPC ... G06K 19/06037; G06K 7/14; G06K 7/1417
(Continued)

(56) References Cited

U.S. PATENT DOCUMENTS 10,371,892 B2 *    8/2019    Zheng .................... G02B 5/008
2011/0285942 A1    11/2011    Guo et al.
(Continued)

FOREIGN PATENT DOCUMENTS

JP    2006-293972 A    10/2006
JP    2013-525863 A    6/2013
(Continued)

OTHER PUBLICATIONS

International Search Report issued in PCT/EP2016/065877 dated Oct. 10, 2016 (8 pages).
(Continued)

*Primary Examiner* — Ahshik Kim
(74) *Attorney, Agent, or Firm* — Osha Liang LLP

(57) ABSTRACT

According to a first aspect, the present description relates to a device for optically encoding an image, which device is intended to be observed in at least one first spectral band of observation. The encoding device comprises a supporting structure and a set of metal-dielectric-metal plasmonic antennae formed on said supporting structure, each plasmonic antenna being resonant at at least one wavelength comprised in said first spectral band of observation, the plasmonic antennae being arranged spatially on the supporting structure in such a way as to form at least one first spatial encoding of said image in said first spectral band of observation.

14 Claims, 15 Drawing Sheets

(51) Int. Cl.
  *B42D 25/36* (2014.01)
  *G02B 5/00* (2006.01)
(52) U.S. Cl.
  CPC ......... *G02B 5/008* (2013.01); *G06K 19/0614* (2013.01); *G06K 19/06028* (2013.01)
(58) Field of Classification Search
  USPC ........................................................ 235/494
  See application file for complete search history.

(56) References Cited

U.S. PATENT DOCUMENTS

| | | | |
|---|---|---|---|
| 2012/0015118 A1 | 1/2012 | Zheludev et al. | |
| 2017/0299784 A1* | 10/2017 | Mikkelsen | H01L 33/26 |
| 2019/0170904 A1* | 6/2019 | Topolancik | G02B 1/005 |

FOREIGN PATENT DOCUMENTS

| | | |
|---|---|---|
| WO | 2013/039454 A1 | 3/2013 |
| WO | 2016-191871 A1 | 12/2016 |

OTHER PUBLICATIONS

Written Opinion of the International Searching Authority issued in PCT/EP2016/065877 dated Oct. 10, 2016 (6 pages).

Cui, Y. et al.; "Plasmonic and metamaterial structures as electromagnetic absorbers"; Laser Photonics Rev., vol. 8, No. 4, 2014, pp. 495-520 (26 pages).

Hao, J. et al.; "High performance optical absorber based on a plasmonic metamaterial"; Applied Physics Letters, vol. 96, No. 251104, 2010 (4 pages).

Notice of Reasons for Refusal in corresponding Japanese Application No. 2018-522852, dated Mar. 30, 2020 (14 pages).

* cited by examiner

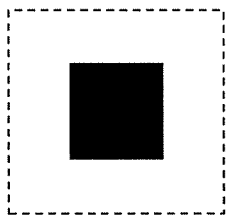 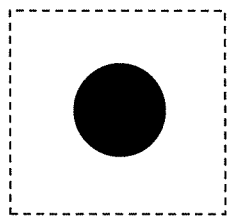 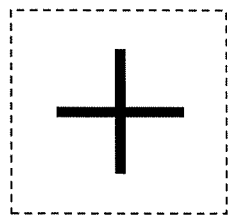 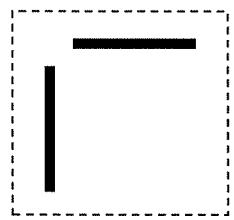
FIG.3A  FIG.3B  FIG.3C  FIG.3D
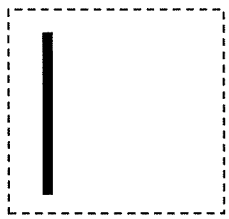 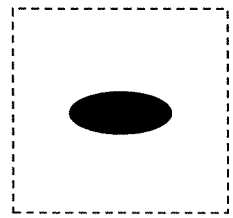 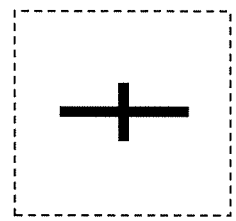 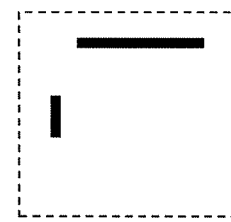
FIG.3E  FIG.3F  FIG.3G  FIG.3H
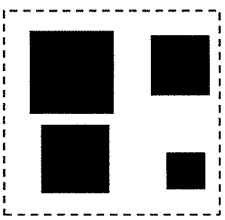 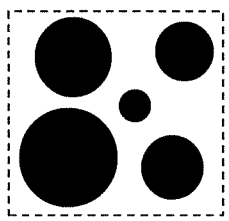 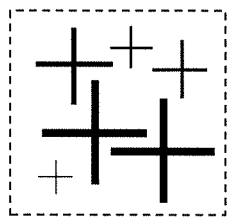 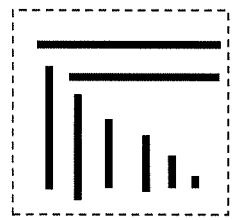
FIG.4A  FIG.4B  FIG.4C  FIG.4D $P_1$ Horizontal Polarization (Visible)

| 3 | 6 | 5 | 8 | 6 | 6 | 5 | 6 | 5 | 6 | 7 | 3 | 1 | 2 | 1 | 2 |
|---|---|---|---|---|---|---|---|---|---|---|---|---|---|---|---|
| 3 | 7 | 3 | 4 | 6 | 4 | 8 | 4 | 2 | 1 | 4 | 4 | 6 | 4 | 8 | 8 |
| 2 | 2 | 4 | 1 | 4 | 3 | 6 | 8 | 6 | 3 | 2 | 1 | 2 | 8 | 2 | 2 |
| 3 | 6 | 3 | 8 | 8 | 2 | 4 | 2 | 4 | 7 | 7 | 6 | 5 | 7 | 4 | 1 |
| 5 | 5 | 5 | 2 | 5 | 6 | 4 | 3 | 4 | 2 | 4 | 7 | 8 | 5 | 2 | 1 |
| 3 | 7 | 2 | 5 | 6 | 6 | 5 | 2 | 4 | 6 | 8 | 6 | 1 | 6 | 3 | 4 |
| 1 | 2 | 1 | 8 | 1 | 4 | 2 | 7 | 6 | 1 | 7 | 6 | 5 | 6 | 5 | 4 |
| 3 | 4 | 2 | 5 | 1 | 3 | 7 | 8 | 6 | 1 | 2 | 3 | 7 | 2 | 5 | 2 |
| 7 | 5 | 7 | 6 | 2 | 5 | 4 | 8 | 7 | 8 | 5 | 5 | 4 | 5 | 6 | 8 |
| 3 | 5 | 3 | 5 | 2 | 6 | 5 | 5 | 5 | 8 | 2 | 6 | 2 | 7 | 8 | 7 |
| 8 | 5 | 8 | 8 | 1 | 3 | 4 | 7 | 6 | 3 | 8 | 3 | 5 | 2 | 3 | 6 |
| 4 | 3 | 5 | 3 | 3 | 1 | 2 | 7 | 3 | 4 | 2 | 5 | 1 | 3 | 3 | 2 |
| 1 | 3 | 6 | 5 | 8 | 5 | 3 | 4 | 4 | 1 | 8 | 2 | 5 | 7 | 3 | 2 |
| 8 | 4 | 7 | 5 | 5 | 8 | 2 | 2 | 3 | 3 | 8 | 8 | 8 | 1 | 2 | 8 |
| 8 | 8 | 6 | 2 | 3 | 6 | 6 | 1 | 2 | 2 | 2 | 5 | 6 | 5 | 6 | 2 |
| 5 | 8 | 3 | 6 | 1 | 2 | 2 | 8 | 4 | 6 | 5 | 7 | 1 | 7 | 3 | 6 |

FIG.7A

1 = White       5 = Pink
2 = Light Blue  6 = Red
3 = Yellow      7 = Dark Blue
4 = Green       8 = Black $P'_1$ Vertical Polarization (Visible)

| 6 | 3 | 6 | 4 | 1 | 7 | 6 | 7 | 3 | 2 | 6 | 8 | 1 | 6 | 1 | 6 |
|---|---|---|---|---|---|---|---|---|---|---|---|---|---|---|---|
| 2 | 3 | 3 | 8 | 6 | 5 | 1 | 7 | 8 | 8 | 1 | 2 | 1 | 7 | 3 | 4 |
| 8 | 5 | 6 | 2 | 7 | 2 | 2 | 3 | 8 | 2 | 7 | 7 | 1 | 8 | 3 | 5 |
| 5 | 1 | 4 | 4 | 1 | 3 | 2 | 3 | 1 | 2 | 1 | 7 | 2 | 5 | 3 | 8 |
| 8 | 5 | 8 | 7 | 1 | 4 | 8 | 7 | 8 | 2 | 2 | 4 | 3 | 4 | 1 | 7 |
| 6 | 5 | 7 | 8 | 4 | 5 | 2 | 3 | 5 | 3 | 3 | 5 | 7 | 6 | 1 | 1 |
| 4 | 8 | 1 | 1 | 6 | 2 | 3 | 4 | 5 | 8 | 2 | 6 | 3 | 7 | 7 | 6 |
| 8 | 1 | 8 | 4 | 5 | 3 | 8 | 3 | 1 | 5 | 2 | 1 | 6 | 6 | 4 | 5 |
| 5 | 3 | 8 | 4 | 3 | 5 | 3 | 6 | 1 | 4 | 5 | 5 | 6 | 3 | 7 | 3 |
| 2 | 5 | 3 | 4 | 8 | 6 | 7 | 5 | 5 | 2 | 1 | 1 | 4 | 4 | 7 | 1 |
| 8 | 7 | 2 | 1 | 2 | 6 | 7 | 5 | 6 | 3 | 7 | 2 | 1 | 7 | 3 | 8 |
| 4 | 8 | 6 | 3 | 5 | 4 | 1 | 1 | 4 | 5 | 6 | 2 | 3 | 2 | 2 | 2 |
| 2 | 5 | 5 | 6 | 6 | 2 | 8 | 3 | 7 | 8 | 6 | 7 | 5 | 6 | 1 | 6 |
| 4 | 3 | 2 | 7 | 2 | 1 | 5 | 3 | 8 | 4 | 7 | 2 | 8 | 8 | 2 | 7 |
| 5 | 8 | 2 | 1 | 2 | 2 | 1 | 4 | 1 | 1 | 1 | 5 | 8 | 5 | 4 | 4 |
| 5 | 4 | 4 | 4 | 3 | 5 | 6 | 5 | 2 | 7 | 7 | 7 | 7 | 3 | 7 | 5 |

FIG.7B

1 = White       5 = Pink
2 = Light Blue  6 = Red
3 = Yellow      7 = Dark Blue
4 = Green       8 = Black $Q_1$ Horizontal Polarization (Infrared)

| 2 | 1 | 4 | 3 | 3 | 2 | 4 | 3 |
|---|---|---|---|---|---|---|---|
| 4 | 4 | 1 | 3 | 4 | 1 | 1 | 4 |
| 4 | 3 | 4 | 3 | 3 | 3 | 3 | 1 |
| 3 | 1 | 4 | 2 | 2 | 2 | 3 | 4 |
| 2 | 1 | 2 | 3 | 2 | 4 | 4 | 4 |
| 1 | 4 | 4 | 4 | 3 | 4 | 3 | 2 |
| 1 | 2 | 4 | 4 | 1 | 3 | 3 | 4 |
| 2 | 1 | 2 | 1 | 2 | 4 | 3 | 3 |

1 = White
2 = Light Gray
3 = Dark Gray
4 = Black

FIG.7C $Q'_1$ Vertical Polarization (Infrared)

| 1 | 3 | 4 | 1 | 2 | 2 | 3 | 1 |
|---|---|---|---|---|---|---|---|
| 2 | 4 | 2 | 3 | 4 | 1 | 3 | 3 |
| 1 | 1 | 4 | 1 | 1 | 1 | 2 | 2 |
| 4 | 1 | 2 | 2 | 1 | 2 | 3 | 2 |
| 3 | 3 | 3 | 4 | 4 | 1 | 4 | 4 |
| 4 | 2 | 4 | 1 | 3 | 1 | 2 | 2 |
| 1 | 1 | 4 | 1 | 4 | 4 | 4 | 3 |
| 2 | 4 | 1 | 1 | 2 | 3 | 4 | 4 |

1 = White
2 = Light Gray
3 = Dark Gray
4 = Black

FIG.7D

DEVICE AND METHOD FOR OPTICALLY ENCODING AN IMAGE

TECHNICAL FIELD

This invention relates to a device for optical encoding of image-type spatial information as well as a method for optical encoding of such information; the invention applies in particular to protection against counterfeiting of valuable objects.

STATE OF THE ART

Many devices are known for the protection against counterfeiting of valuable objects such as jewelry, perfume bottles, clothing, bank cards, bank notes.

These devices comprise, for example, optical security elements that provide visual effects that vary according to the angle of incidence and/or observation, such as diffractive elements, holograms, etc. It is thus possible by means of these optical elements to mark valuables securely by using spatial information, for example, images, alphanumeric characters, etc. are used as identification information.

Among the optical security elements, plasmonic devices are also known that comprise metal-dielectric interfaces, the metal layer being structured in the form of gratings to allow an incident wave of a certain wavelength to be coupled to a surface plasmon.

For example, US patent application 20120015118 describes a method for controlling the color of a metal, implementing the excitation of surface plasmons on a metal-dielectric interface when the interface is illuminated by incident optical radiation. This method is applied in particular to the protection against counterfeiting of valuables such as banknotes. More specifically, the patent application cited above describes the formation of a set of metal sub-wavelength structures, arranged repeatedly and obtained for example by embossing a metal surface, so as to allow coupling at a given resonance wavelength of incident light-waves with surface plasmons. The observed optical effect, which is strongly dependent on the angle of incidence and/or observation, includes in particular a color change in the metal surface, making it possible to create color-variable metal patterns on valuable objects for aesthetic purposes and/or protection against counterfeiting.

However, a coupling structure etched in the form of a grating requires dimensions on the order of a dozen or so wavelengths to obtain an efficient coupling of an incident light wave with a surface plasmon, the coupling resulting from the collective effect of the subwavelength structures. The method thus described in the application US 20120015118 is therefore not suitable for the formation of miniature marking devices for securing objects, which are typically less than a few tens of microns, for example, to protect against counterfeiting of small objects. Moreover, the angular dependence of the visual effect obtained can be a strong constraint for certain applications such as gems or jewelry, where one seeks to obtain colors independent of the angle of observation.

This description seeks to propose an optical encoding device that makes spatial encoding of data on elementary cells possible, the dimensions of which may be on the order of the wavelength, notably allowing the creation of miniature marking devices for protection against counterfeiting.

SUMMARY

According to a first aspect, this description relates to a device for optical encoding of at least one spatial unit of information or "image", which may be decomposed into pixels each defined by a position in the image and at least one value, an image comprising at least two pixels of different values. The encoding device is intended to be observed in at least one first spectral band of observation and comprises a supporting structure and a set of plasmonic nanoantennas of the metal-dielectric-metal type, formed on said supporting structure, such as:

each plasmonic nanoantenna is resonant to at least one wavelength comprised in said first spectral band of observation, the plasmonic nanoantennas are arranged spatially on the supporting structure so that at one pixel of the image, a subset of one or more plasmonic nanoantenna(s) is associated, whose optical polarization response and in a spectral band comprised in the first spectral band of observation corresponds to a value of said pixel, the set of plasmonic nanoantennas thus forming at least a first spatial encoding of said image in said first spectral band of observation.

In known manner, a plasmonic nanoantenna is resonant at a given wavelength $\lambda_R$, called the resonance wavelength, if its length, measured in a given direction, is equal to $\lambda_R/2np$, where n is the refractive index of the dielectric material forming the metal-dielectric-metal structure, p is a non-zero natural integer.

Such a plasmonic nanoantenna has a localized resonance, that is to say that it is able to generate an optical response in a spectral band centered around the resonance wavelength, on a cross section whose surface is on the order of the square of the resonant wavelength.

In this description, "optical response" means an optical response measured in far field, that is to say at a distance greater than twice the wavelength; the optical response can result from a measurement of a reflected luminous flux or the measurement of a flux emitted due to the thermal emission of the nanoantennas.

It is thus possible thanks to an arrangement of a set of plasmonic nanoantennas, to encode a spatial information comprising a set of "pixels" (or elementary information elements) each defined by a position and one or more value(s): the geometrical parameters (shape, dimensions, orientation) of a plasmonic nanoantenna arranged on the supporting structure at a given position are chosen to generate, in a spectral band comprised in the spectral band of observation, an optical response corresponding to the value of a pixel located at a corresponding position in the image.

Such an encoding device can be observed in emission (thermal emission of the nanoantennas heated by an external heat source) or in reflection (under illumination with a given incident flux). In the latter case, the resonant absorption of the nanoantennas results in a modification of the spectrum of the wave reflected with respect to the incident wave.

The spectral band of observation can be comprised within a range of wavelengths from UV (300-450 nm) to THz (up to 300 microns).

According to one or more embodiments, the first spatial encoding comprises grayscale encoding; the geometrical parameters of the subset of one or more nanoantenna(s) associated with a pixel are chosen to generate an optical response measured according to a polarization and in a given spectral band included in the spectral band of observation, exhibiting a relative intensity ("gray level") variable according to the position and corresponding to the value of the pixel, which is defined as a gray level in a scale of gray levels.

According to one or more embodiments, the materials from which the metal-dielectric-metal structures are formed constitute the nanoantennas as well as the form of the nanoantennas being chosen, a variation of the dimensions and/or the orientation of the nanoantennas makes it possible to vary the relative intensity of the optical response in a given spectral band and/or according to a given polarization by degrading the optimal conditions of resonant absorption or emission of the nanoantennas.

According to one or more embodiments, a subset of plasmonic nanoantennas associated with a pixel comprises plasmonic nanoantennas having different resonance wavelengths for the same polarization; an optical response is then obtained in a spectral band covering all the resonance wavelengths resulting from an additive synthesis of the optical responses of each of the nanoantennas in the case of a emission observation or an optical response is obtained resulting from a subtractive synthesis of the optical responses of each of the nanoantennas in the case of an observation in reflection. In this case, a grayscale encoding can be obtained by adjusting the presence or absence of the resonant nanoantennas at different wavelengths.

According to one or more embodiments, the first spatial encoding is a "color coding" of the image; a pixel of the image having at least a first and a second defined value, for example at different wavelengths, it is possible to associate with each pixel a subset of nanoantennas having, in a given polarization, at least a first and a second optical response respectively in a first and a second spectral band in the first spectral band of observation. The first and second optical responses correspond to the first and second values of the pixel, in order to reproduce the color coding of the image.

According to one or more embodiments, at least one portion of the plasmonic nanoantennas of the set of plasmonic nanoantennas is resonant in a first polarization and at least a portion of the plasmonic nanoantennas of the set of plasmonic nanoantennas is resonant according to a second polarization; in these examples, the plasmonic nanoantennas may be arranged spatially on the supporting structure so as to form a first spatial encoding of a first spatial unit of information or image, observable according to the first polarization, and a second spatial encoding of a second spatial or image, observable in the second polarization.

According to one or more embodiments, at least one portion of the plasmonic nanoantennas of the set of plasmonic nanoantennas is resonant in one spectral band of observation and at least a portion of the plasmonic nanoantennas of the set of plasmonic nanoantennas is resonant according to a second spectral band of observation; in these examples, the plasmonic nanoantennas may be arranged spatially on the supporting structure so as to form a first spatial encoding of a first spatial unit of information or image, observable in the first spectral band of observation, and a second spatial encoding of a second spatial unit of information or image, observable in the second spectral band of observation.

According to one or more embodiments, the plasmonic nanoantennas are distributed according to elementary cells of similar shapes and dimensions, each elementary cell comprising one of said subsets of one or more plasmonic nanoantenna(s), the dimensions of an elementary cell corresponding for example to the dimensions of a pixel.

According to one or more embodiments, it is possible to combine plasmonic nanoantennas having different resonance wavelengths for the same polarization within the same elementary cell; an optical response is then obtained in a spectral band covering all the resonance wavelengths resulting from an additive synthesis of the optical responses of each of the nanoantennas in the case of an emission observation or an optical response is obtained resulting from a subtractive synthesis of the optical responses of each of the nanoantennas in the case of an observation in reflection.

According to one or more embodiments, it is also possible to combine plasmonic nanoantennas having different resonance wavelengths for orthogonal polarizations within the same elementary cell. It is thus possible to encode a first spatial unit of information according to a first polarization and a second spatial unit of information according to a second polarization.

According to one or more embodiments, the plasmonic nanoantennas are distributed according to the first elementary cells of similar shapes and dimensions, each of the first elementary cells having an optical response in a first spectral band of observation, and the first elementary cells are distributed according to the second elementary cells of similar shapes and dimensions, each of the second elementary cells having an optical response in a second spectral band of observation. This variant in particular makes encoding of two spatial units of information in two different spectral bands of observation possible.

According to one or more embodiments, the plasmonic nanoantennas are spatially distributed on the substrate to encode at least in a first spectral band of observation and according to a given polarization a spatial unit of information or image, forming a QR encode.

According to one or more embodiments, the plasmonic nanoantennas are spatially distributed on the substrate to encode at least in a first spectral band of observation and according to a given polarization a spatial unit of information or image, forming a recognizable pattern.

According to one or more embodiments, the set of plasmonic nanoantennas comprises a first continuous metal layer, a second continuous layer of dielectric material formed on the first metal layer, a third metal layer structured to locally form metal-dielectric-metal stacks, forming the plasmonic nanoantennas. An encoding device thus constituted can be realized by means of simple processes and industrially controlled by "nanoimprint" techniques.

Dielectric material means any material or combination of materials whose imaginary number of the index does not exceed 0.2 in the spectral band of interest.

According to one or more embodiments, the encoding device further comprises a substrate forming the supporting structure and upon which the first continuous layer of metallic material is deposited.

Alternatively, the supporting structure can be formed directly by the first layer of metallic material. For example, the supporting structure can be formed directly by a metal part of an object to be secured.

Alternatively, the supporting structure may be formed directly by the second layer of dielectric material, for encoding devices of reduced lateral dimensions because of the limited thickness of the second layer of dielectric material (typically less than one tenth of the minimum wavelength of the spectral band of observation considered).

According to a second aspect, this description relates to a secured object provided with an encoding device according to any one of the preceding Claims. The secured object is for example an object chosen from one of the following categories: jewelry, perfume bottles, clothing, bank cards, bank notes, identity documents (identity cards, passports, driving licenses, etc.) or any valuable document (gift certificates, etc.).

According to a third aspect, this description relates to a method of spatial information or image encoding, in a given spectral band of observation, by means of an encoding device according to the first aspect.

According to one or more embodiments, the encoding method comprises:
- decomposition of the image into pixels, each pixel having a position in the image;
- each pixel is assigned the value of at least one pixel;
- for each pixel, the determination of a subset of one or more plasmonic nanoantenna(s) whose optical response according to a polarization and in a spectral band comprised in the spectral band of observation corresponds to the value of the pixel;
- the production of the metal-dielectric-metal structures on the supporting structure to form all the nanoantennas.

According to one or more embodiments, the image being decomposed into pixels of identical shapes and dimensions, the encoding method comprises the determination of an elementary cell for each pixel defined by a position on the supporting structure, a shape and a dimension corresponding respectively to the position of the pixel in the image, the shape and the dimension of the pixel and, for each elementary cell, the determination of said set of nanoantennas whose optical response is equal to the value of the pixel.

BRIEF DESCRIPTION OF THE DRAWINGS

Other advantages and characteristics of the invention will become apparent upon reading the description, illustrated by the following figures:

FIG. 3A to 3H, diagrams illustrating elementary patterns of MDM nanoantennas, adapted for the formation of an encoding device according to this description;

FIG. 4A-4D, diagrams illustrating patterns formed of combinations of MDM antennas for the formation of elementary cells of an encoding device according to this description;

FIG. 7A to 7D, the optical responses of the encoding device encoding the QR code illustrated in FIG. 6, according to each of the polarizations and in two spectral bands;

DETAILED DESCRIPTION

Figure 1A:
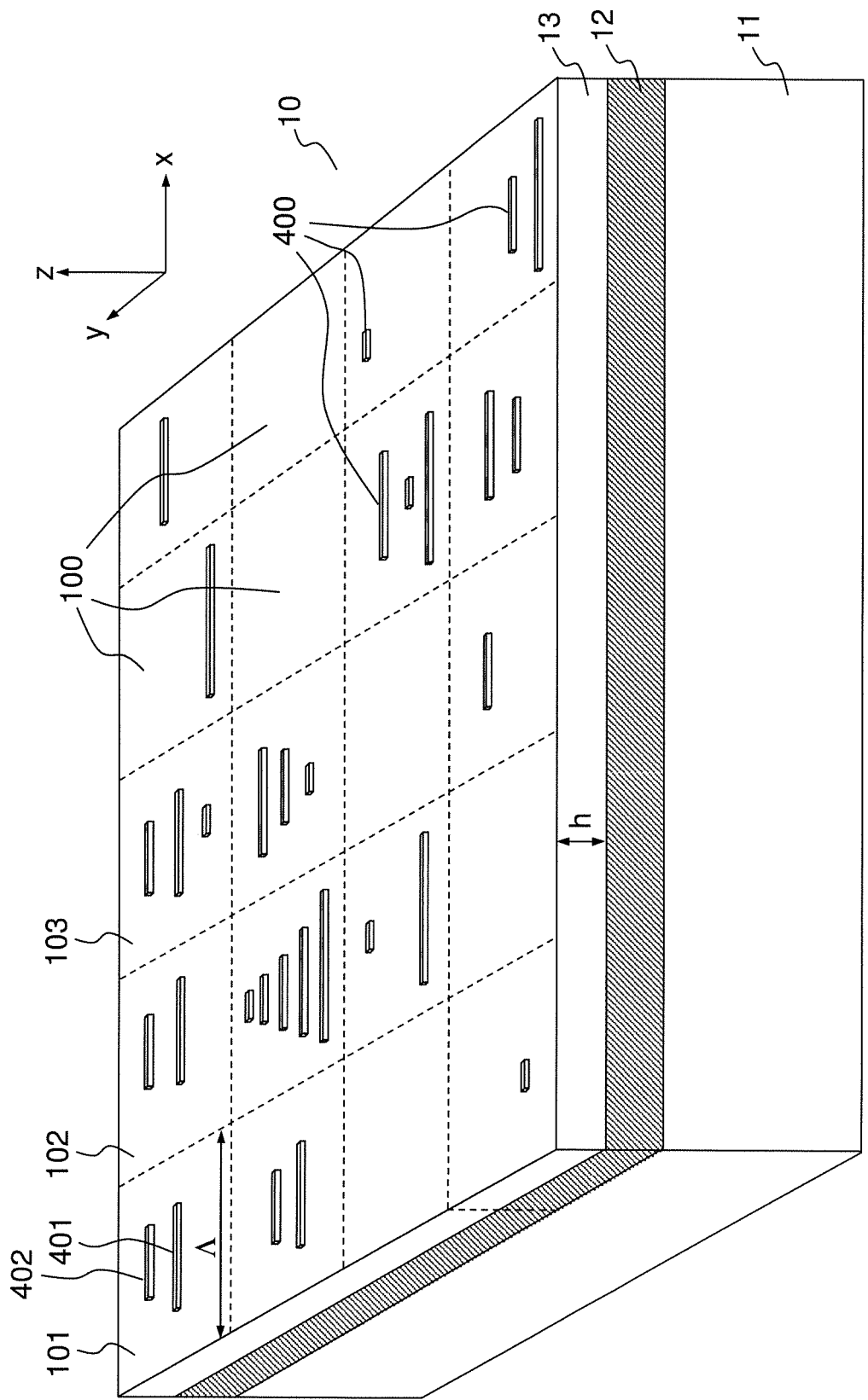
FIGS. 1A and 1B, diagrams illustrating two examples of encoding devices according to this description.
Figure 1B:
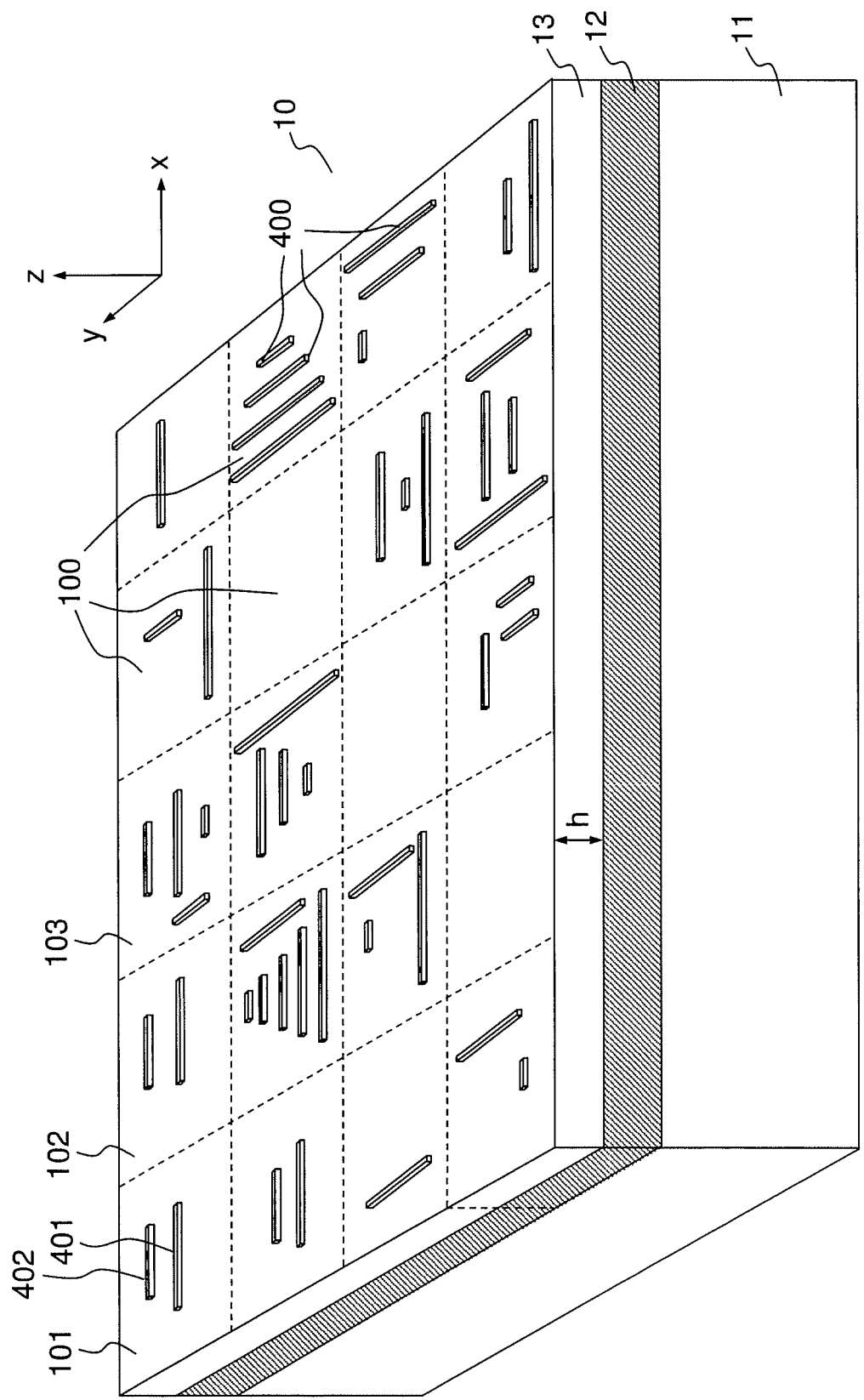

FIGS. 1A and 1B illustrate two examples of encoding devices according to this description.

The coding device 10 comprises, in each of these examples, a supporting structure substrate 11, a first continuous metal layer 12 deposited on said substrate, a layer of dielectric material 13 deposited on the metal material layer 12 and a second metal layer structured to form a set of metal "pads" 400 whose geometric characteristics are chosen so as to form, with the layer 13 of dielectric material, metal-dielectric-metal structures (MDM) each forming a plasmonic nanoantenna and which will be described in more detail later.

The substrate is for example chosen from glass, silicon or plastic.

The dielectric material is chosen from any material or combination of materials whose imaginary number of the index does not exceed 0.2 in the spectral band of interest and which, preferably, does not exhibit absorption. For example, the layer of dielectric material comprises an oxide (e.g., silica (SiO2), titanium oxide (TiO2), magnesium oxide (MgO2), alumina (Al2O3), zinc sulphide (ZnS), a glass, a plastic or resin material (e.g. polymethylmethacrylate (PMMA), polyethylene terephthalate (PET), Capton, benzocyclobutene (BCB) . . . ), a textile material (e.g., silk), or a combination of two or more layers of these materials, and may or may not include a layer of air. These materials make it possible to cover the spectral range from UV to THz.

The first and second metal layers are for example chosen from gold, aluminum, copper, or silver. Aluminum and silver make it possible to extend the operation of the encoding device to the UV range (300-450 nm), and all these materials operate from visible to THz (typically 300 μm).

According to another embodiment (not shown in the Figures), the supporting structure may be formed by one of the metal layers 12 and the dielectric material layer 13, in which case the substrate 11 is not necessary. When dealing with an object to be secured by means of the encoding device according to this description, the continuous metal layer 12 may be formed by a metal part of said object and may form a supporting structure.

As illustrated in FIGS. 1A and 1B, the geometric characteristics of the pads 400 (shape, dimensions, orientation) are chosen based on their position in the plane of the supporting structure for encoding a spatial unit of information or "image" formed from a set of pixels defined by a position and one or more values (e.g., gray level, color).

More precisely, in the embodiments illustrated in FIGS. 1A and 1B, the pads 400 are grouped together in the form of a set of elementary cells 100 of similar shapes and dimensions, evenly distributed over the substrate. The shapes of the elementary cells may be several: square, rectangular, triangular, hexagonal, octagonal, etc. The elementary cells each correspond to one "pixel" of the spatial information that one seeks to encode and their dimensions are therefore adapted to the dimensions of the pixels. In practice, the dimensions of the pixels can be chosen based on the device intended to authenticate the encoding device and more precisely of the detector and the image forming objective on the detector. Thus, the minimum dimensions of the pixels will be on the order of half of the maximum wavelength of the spectral band of observation, which corresponds to the diffraction limit of the imaging objective. Depending on the size of an elementary cell, there may be one or a subset of nanoantennas per elementary cell, resonant at the same wavelength or at different wavelengths.

In the examples of FIGS. 1A and 1B, each elementary cell comprises a subset of pads 400 forming plasmonic nanoantennas. The pads are rectangular parallelepipeds whose length defines the resonance wavelength. They are oriented in one direction in the example of FIG. 1A, while in the example of FIG. 1B, the pads are rectangular parallelepipeds oriented in two perpendicular directions.

In the example of FIG. 1A, the optical response is observed according to a polarization and results from an additive synthesis of the optical responses of each of the nanoantennas in the case of an emission observation or results from a subtractive synthesis of the optical responses from each of the nanoantennas in the case of an observation in reflection.

The optical response of an elementary cell in the case of the example of FIG. 1B differs according to whether one observes the polarization encoding device TM or TE and results, as in the example of FIG. 1A, of an additive or subtractive synthesis of the responses of each nanoantenna of the elementary cell, according to any of the polarizations. An encoding device as represented in FIG. 1B thus makes it possible to encode two spatial units of information, a first spatial unit of information according to a first polarization and a second spatial unit of information according to a second polarization. In practice, the observation of an encoding device as represented in FIG. 1B and encoding the first and second spatial units of information can be done in reflection or in emission through a polarizer whose axis is oriented according to any of the polarizations.

Figure 2A:
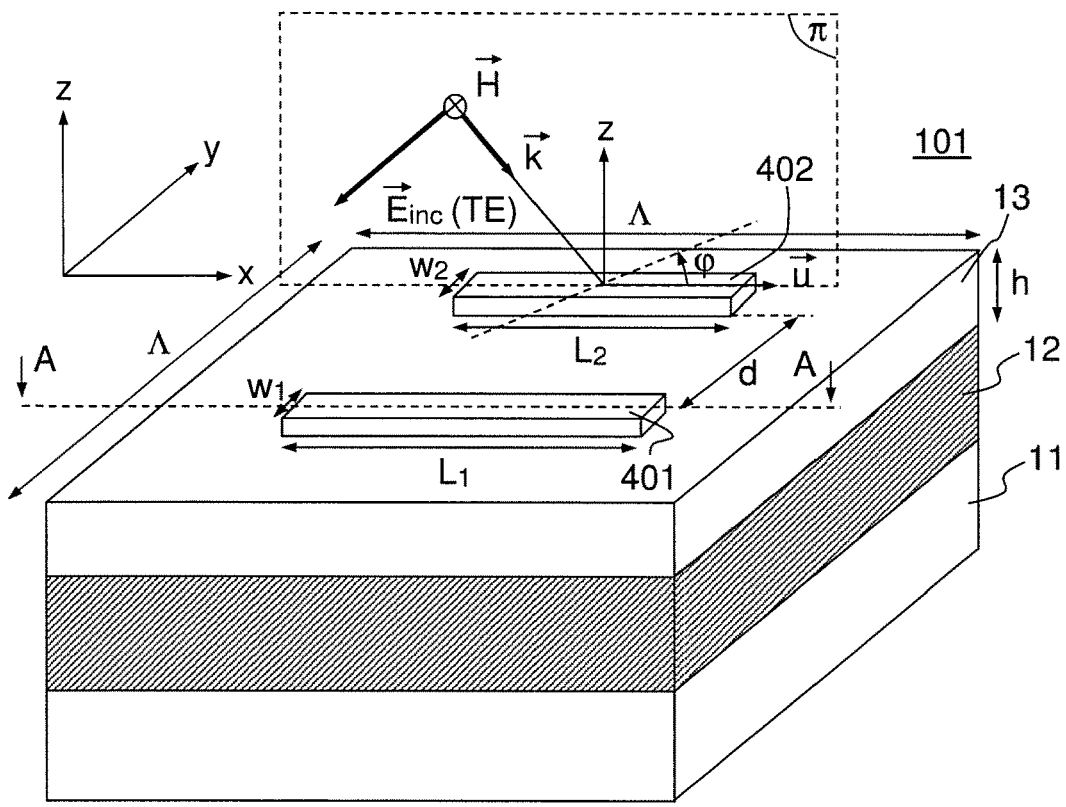
FIGS. 2A and 2B, a diagram respectively showing an example of an elementary cell of an encoding device and a cross-sectional view of said elementary cell.
Figure 2B:
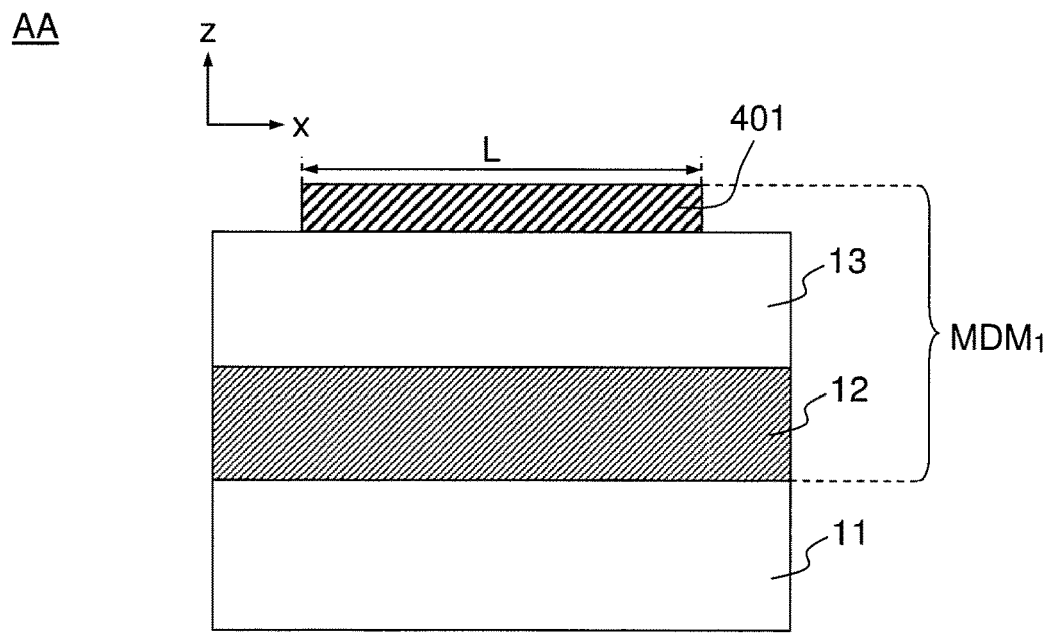

FIGS. 2A and 2B respectively illustrate a diagram of an elementary cell 101 of an encoding device as illustrated in FIG. 1A or 1B and a sectional view of this elementary cell.

In this example, the elementary cell is square, and has a dimension A side. Two metal pads 401, 402 of a parallelepiped shape are arranged on the elementary cell 101, of respective dimensions ($L_1$, $w_1$), ($L_2$, $w_2$), separated by a distance d, oriented in the same direction that defines the polarization of the absorbed (or emitted) wave. FIG. 2B shows a sectional view at pad 401.

The height of the pads is advantageously greater than the skin thickness of the metal (typically 25 nm for gold from 600 nm to 12 µm) to prevent leakage from the MDM cavity via the upper metal layer.

It is known that a metal-dielectric-metal structure thus formed at each of the metal pads 401, 402 forms a plasmonic nanoantenna having a resonance wavelength (respectively $\lambda_{R1}$, $\lambda_{R2}$) depending on the length of the nanoantenna (respectively $L_1$, $L_2$) and the choice of the dielectric material. It is shown that as a first approximation (see for example Cui et al., Laser & Photonics Review pp 500-502 (2014)), the length $L_i$ of a rectangular nanoantenna sets the resonance wavelength $\lambda_{Ri}$ to 10% according to equation (1) below:

$$\lambda_{Ri} \approx 2n_D L_i \qquad (1)$$

Where $n_D$ is the refractive index of the dielectric material.

Such a nanoantenna has an extraordinary absorption of an incident wave at said wavelength and for a polarization known as transverse (TE) of the incident light wave, that is to say for the component of the wave incident light whose magnetic field H is perpendicular to the direction of the nanoantenna according to which the length $L_i$ is measured (see FIG. 2A). Such a nanoantenna also has an extraordinary emission at said wavelength of a light wave having a transverse polarization, the emission response (or spectral radiance) of the nanoantenna at a given temperature T being the product of the resonant emission (emissivity) with the emission from the black body at temperature T (spectral radiance of the black body).

Figure 2C:
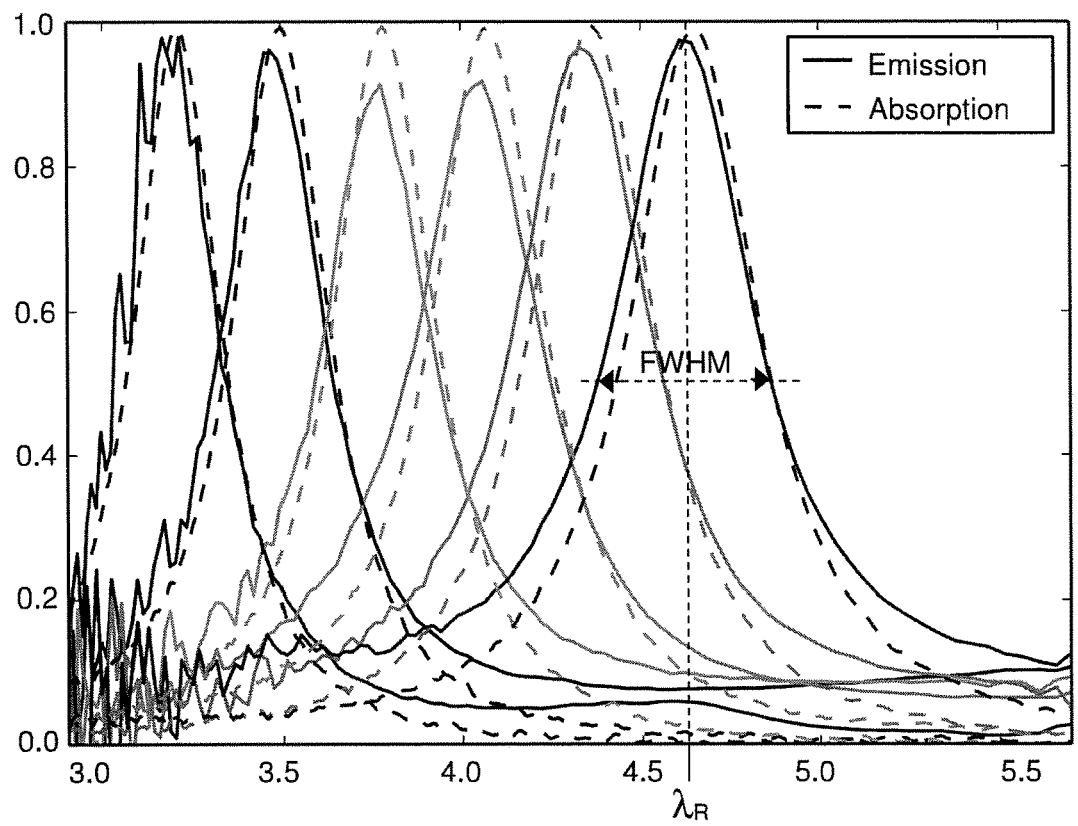
FIG. 2C to 2E are curves respectively showing the normalized emission and absorption of plasmonic nanoantennas, for different values of resonance wavelengths in the band 3-5 μm; the spectral radiance of the black body compared to emission curves of plasmonic nanoantennas at different resonance wavelength values; an example of grayscale values of the optical response as a function of the width of plasmonic nanoantennas, in the case of nanoantennas of a rectangular parallelepiped shape.

FIG. 2C thus illustrates curves showing the absorption (in dashed line) and the emission (solid line) of plasmonic nanoantennas having different resonant wavelengths.

Figure 2D:
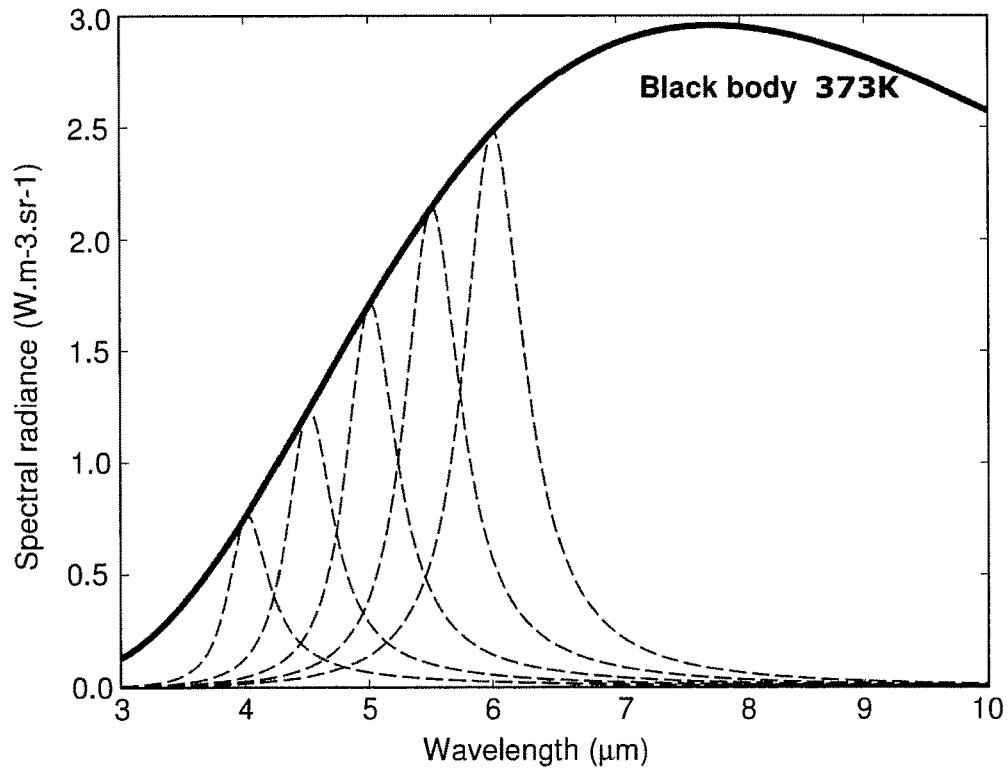

FIG. 2D shows the luminance curve of the black body at 373K and plasmonic nanoantennas of the MDM type optimized to absorb 100% of the flux (emissivity of 1) at different resonant wavelengths (4, 4.5, 5, 5.5 and 6 µm).

The quality factor Q of such a nanoantenna, equal to the ratio between the resonance wavelength $\lambda_{Ri}$ and the halfway width of the resonance (FWHM), once the chosen materials, depends in a known manner on several geometrical parameters such as the thickness e of the layer of dielectric material, the width I and the length L of the nanoantenna. By working with a given thickness e of the layer of dielectric material between $\lambda_{Ri}/100$ and $\lambda_{Ri}/5$ it is thus possible to vary the optical response in reflection or emission from a nanoantenna to a length of a given observation wavelength, from 0% to 100% and according to a given polarization, by varying the width, the length or the orientation. The determination of these parameters to obtain a given response can be done using known calculation software, such as the Comsol© software.

The spectral range of operation of a nanoantenna therefore depends only on the choice of the dielectric material and can range from UV (from 350 nm) to THz (up to 300 µm).

In the example illustrated in FIG. 2A, the choice of two metal pads arranged in the same direction but of different lengths allows resonance of the nanoantennas thus formed at two different resonance wavelengths, for the same polarization. This results in an optical response at the level of the cell 101, which is an additive or subtractive synthesis of the responses of each of the nanoantennas, depending upon whether the encoding device is observed in emission or in reflection, upon the responses from the two nanoantennas formed by the pads 401, 402.

Thus, by means of the nanoantennas of a rectangular parallelepiped shape as described in FIGS. 2A and 2B, or in the examples given in FIGS. 1A and 1B, it is possible to carry out an encoding of one or more spatial units of information, in color or in grayscale, for an observation in reflection or emission, according to a given polarization and/or at a given wavelength or in a given observation range. The following paragraphs give examples of grayscale or color coding, using rectangular nanoantennas.

Examples of Spatial Information Encoding in Grayscale:

We start from a grayscale image, for example a two-dimensional pixelated image. Each pixel is therefore associated with a pixel value, which is a grayscale.

According to a first variant, reproduction of this level of grayscale is sought in reflection or in emission in a spectral measurement band centered on a wavelength A included in the spectral band of observation.

According to a first variant, the spectral measurement band typically has a width of $\lambda/10$, and corresponding to the width of the response of a resonant nanoantenna at the observation wavelength (see FIG. 2C). In practice, the measurement can be done through an appropriate filter.

In order to obtain grayscale, according to this example, a rectangular metal-dielectric-metal nanoantenna, as previously described, is used. The length L of the nanoantenna sets the wavelength of the maximum absorption or thermal emission (see equation 1).

By properly choosing the thickness of the dielectric (which is then a fixed parameter for all the nanoantennas), it is thus possible according to a first example to obtain all the absorption or emission levels from "0%" to "100%" by changing the width of the nanoantenna, resulting in known manner a change in the efficiency of the nanoantenna compared to a calculated width to optimize the response. For example, in absorption, the level "0%" may in practice correspond at best to the residual absorption of the metal, typically on the order of 5% in the visible band, 2-3% in the infrared band and 1% in the THz range, but with a variability that depends on the nature of the metal.

Figure 2E:
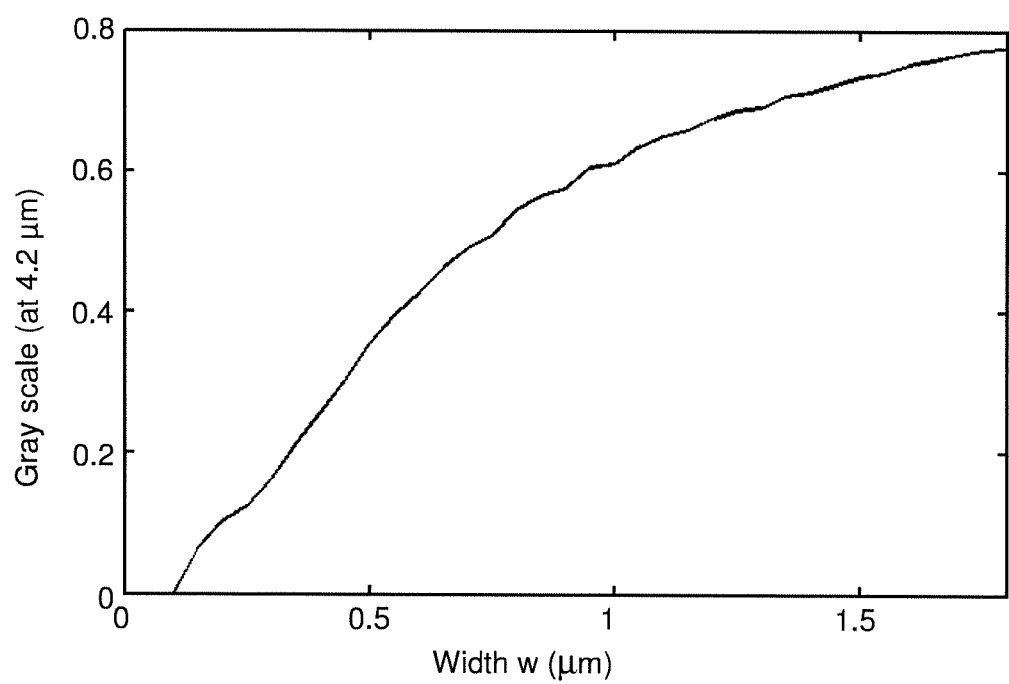

FIG. 2E thus shows optical responses measured in reflection at 4.2 µm as a function of the width w of plasmonic nanoantennas for a nanoantenna with a length of 1.2 µm, and of a silica dielectric material (thickness 220 nm, index 1.4). In this example, the metal is gold and the continuous metal layer has a uniform thickness greater than 100 nm and therefore optically opaque. It is observed in this example that for a nanoantenna having a width of about 100 nm, the reflection is minimal (absorption is maximum); by varying the width, one increases the reflection, this increase results from the nanoantenna having less good absorption.

The pixel can be encoded on an elementary cell whose minimum dimensions are $\lambda/2$, corresponding to the diffraction limit below which far-field structuring cannot be attributed. If one seeks to have a side pixel larger than $\lambda$, one may place several nanoantennas per elementary cells. For example, if we look for a side pixel ~N*$\lambda$, then we can periodically repeat the nanoantenna, for example with a period in the 2 directions of ~$\lambda/2$.

According to a second example, and in the case of pixels of very large size in front of $\lambda$, the grayscale can be obtained solely by virtue of the density of the nanoantennas.

According to a third example, it is also possible to obtain the grayscale in a given spectral band that typically has a width equal to $\lambda/10$, by increasing/decreasing the length of the nanoantenna. Indeed, the response of the antenna is typically Lorentzian (see FIG. 2C); thus, when the length of the antenna is changed, the wavelength of the resonance wavelength is shifted and therefore the response is lower on the spectral band of observation.

In the case of an emission operation of the nanoantennas (FIG. 2D), a grayscale encoding can also be obtained by modifying the length of the bar forming the plasmonic nanoantenna, which results in a displacement of the emission curve of the nanoantenna on the curve of the black body and thus a modification of the optical response.

According to a fourth example, it is possible to obtain the grayscale by varying the orientation of the rectangular antenna in the plane. If the optimized antenna is along the u axis, we will have the grayscale of $\cos(\varphi)^2$ for the same antenna rotated by $\varphi$.

According to a second variant, the spectral band for the measurement of the optical response may be wider. In this case, a grayscale can be obtained by combining several nanoantennas, for example several nanoantennas of different lengths, each having a resonance wavelength of its own in the spectral band of observation. The grayscale can then be obtained by adjusting the response of each nanoantenna according to one of the examples described above (width of the antenna, orientation, density), or by the absence of certain antennas.

According to any of the variants/examples described, it is understood that it is possible to encode several independent spatial units of information. For example, several spatial units of information can be encoded in several spectral bands of observation. The choice of a suitable filter will allow the observation of a given spatial unit of information. It is possible to encode independent spatial units of information according to the two orthogonal polarizations. The choice of a suitable polarizer during the observation will allow the observation of a given spatial unit of information.

Examples of Color Coding of a Spatial Unit of Information:

In this example, we start with a color spatial unit of information, for example a pixelated, two-dimensional image. For each pixel of the image, it is possible for example to define a "RGB" (red green blue) level, which gives a color among a number of possible colors identified, for example 16 million possible colors.

According to one example, for each of the 3 colors, it is possible to define a grayscale image and encode it according to the previously described method of grayscale encoding. Thus, for a given pixel, three resonant nanoantennas with three increasing wavelengths $\lambda_{r1}$, $\lambda_{r2}$ and $\lambda_{r3}$ are chosen. The observation can be made with the naked eye, by means of a multi-spectral camera with RGB filters on each pixel or through three filters respectively. These three wavelengths are advantageously spectrally separated by at least $\lambda_{r3}/10$. The grayscale of each antenna can be determined for example by the width of the antenna or its orientation (polarized response only). It is also possible to adjust the grayscale of each antenna by varying its length if the spectral separation between the 3 resonant wavelengths is great, i.e., by modifying the length to obtain a lower level of absorption. A signal in the $2^{nd}$ spectral band of interest is not created. In practice, this is reflected by a spectral separation of at least $\lambda_{r3}/5$.

As mentioned above, the pixel can be encoded on an elementary cell whose minimum dimensions are $\lambda_{r3}/2$, corresponding to the diffraction limit below which far-field structuring cannot be attributed.

It is thus possible to encode several color spatial units of information in different spectral bands, for example an image in the visible band and an image in the infrared band. In practice, the 2 encoding pixels have dimensions that are multiples of each another (for example, a visible encoding grid with pixels of 250 nm and an infrared grid with pixels of 2 µm), each infrared pixel containing 64 visible pixels.

It is also possible to encode one or more spatial units of information according to any of the polarizations.

It is also possible to encode one or more grayscale spatial units of information and one or more color spatial units of information, in one or more spectral bands, according to any of the polarizations.

Although a particular embodiment has just been described using nanoantennas formed by means of rectangular parallelepiped shaped pads, it is known to those skilled in the art that nanoantennas of different shapes can be produced and that the shape of the metal pads for the formation of the plasmonic nanoantennas is not limited to rectangular parallelepipeds.

Thus, FIGS. 3A to 3H show, in views from above, a set of metal pads suitable for the formation of metal-dielectric-metal structures forming plasmonic nanoantennas. The structures being shown from above present forms of the square pad type (FIG. 3A), circles (FIG. 3B), crosses (FIG. 3C) and combination of rectangles having the same length and along two perpendicular axes (FIG. 3D) present polarization-insensitive responses.

The structures being shown from above present a rectangular shape (FIG. 3E), ellipse (FIG. 3F), asymmetric cross (FIG. 3G) and combination of several rectangles of different lengths along perpendicular axes (FIG. 3H) have an optical response that is polarization dependent.

FIGS. 3E, 3D and 3H show combinations of rectangular parallelepiped shaped pads already described through FIGS. 2A to 2D. The optical response may vary in "color" or grayscale as previously described. FIGS. 3C and 3G show plasmonic nanoantennas which in top view have cross-shaped configurations. These structures have behaviors substantially similar to the behaviors respectively of the nanoantennas represented in FIGS. 3D (rectangles of the same length) and 3G (rectangles of different lengths) and have rules of sizing described for example in Cui et al., Laser & Photonics Review 8, 495 (2014).

Plasmonic nanoantennas obtained by means of square metal pads (see FIG. 3A) have for example been described in Cui et al., Laser & Photonics Review 8, 495 (2014). The rules of sizing are similar to those of the rectangular parallelepiped nanoantennas but they have an optical response independent of the polarization. In the case of square-shaped nanoantennas, grayscale encoding can be obtained by observing in a given spectral band of observation and by varying the size of the square, as previously described.

Plasmonic nanoantennas having a circular shape in a top view are for example described in the same review Article, Cui et al., Laser & Photonics Review 8,495 (2014). Again, the optical response is polarization independent and the rules of sizing are substantially similar to those of square-shaped plasmonic nanoantennas. In the same way as for square-shaped nanoantennas, grayscale encoding can be obtained by observing in a given spectral band of observation and by varying the diameter of the circle.

Plasmonic nanoantennas having an elliptical shape in a top view have sizing rules substantially similar to those of the rectangular-shaped plasmonic nanoantennas.

Other patterns (star, triangle, more complex crosses, etc.) are also possible but have the disadvantage of less flexibility when designing the optical response of the cell.

FIGS. 4A to 4D illustrate, also in top views, elementary cells in which plasmonic nanoantennas having different geometrical shapes are associated.

Each nanoantenna having a resonance length of its own, an elementary cell thus designed makes it possible to generate an optical response from responses of different nanoantennas that results from an additive or subtractive synthesis, depending upon whether the emission or reflection encoding device is observed. In the case of spectral encoding of the information, this allows access to a greater number of optical responses or "colors". Again in this example, some of the elemental cells exhibit polarization-insensitive responses (FIG. 4A, FIG. 4B, 4C) while FIG. 4D illustrates an example in which the "color" depends on the polarization.

FIGS. 5 to 9 illustrate in more detail embodiments of the encoding device according to this description. They implement rectangular nanoantennas but could equally well be designed with nanoantennas having different shapes as those described above. This choice will depend on whether one wishes the optical responses of the nanoantennas to be polarized or not.

Figure 5A:
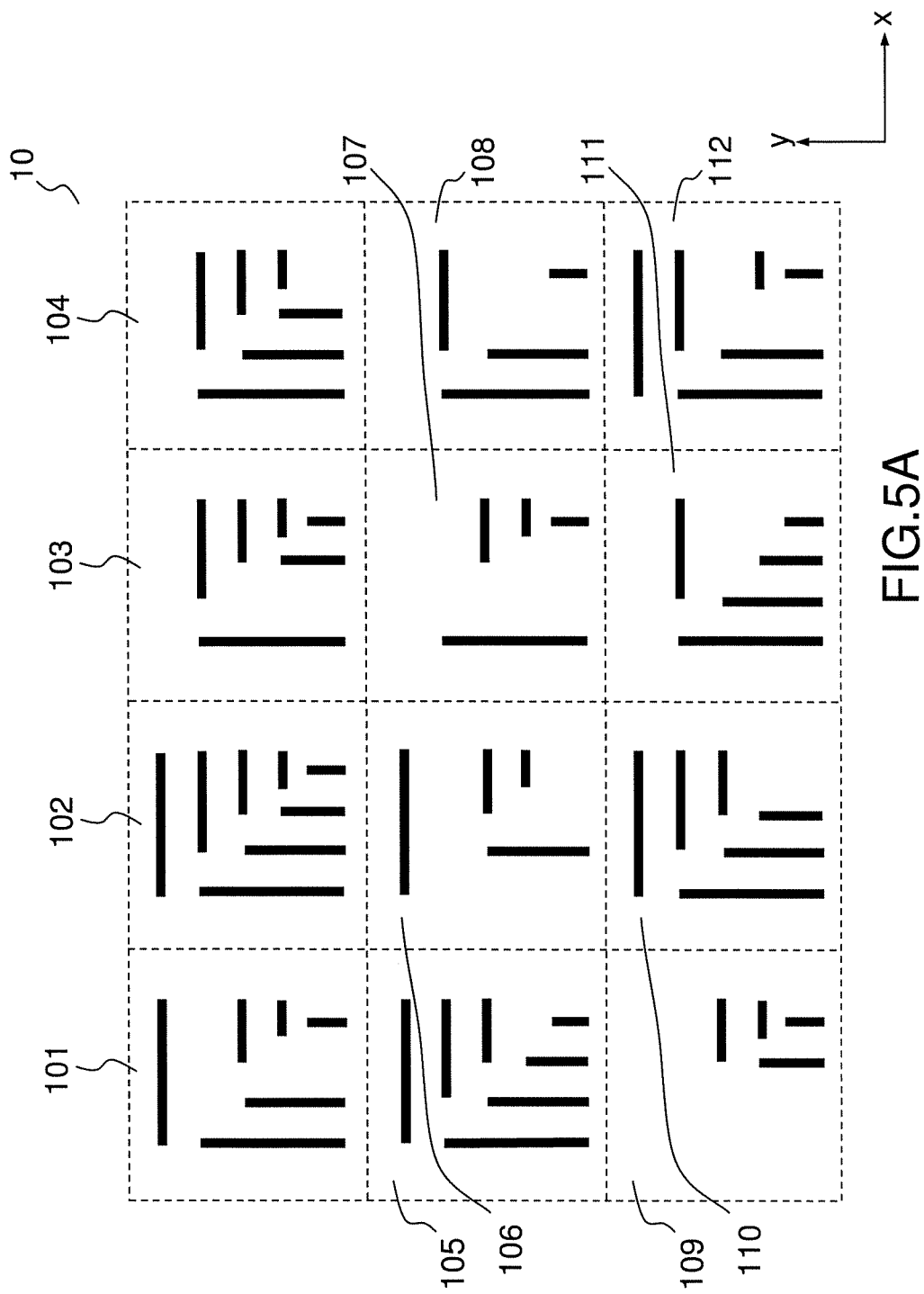
FIGS. 5A and 5B, respectively an example of an encoding device according to this description formed by a set of elementary cells comprising resonant nanoantennas according to two orthogonal polarizations, and the optical responses of each of the elementary cells observed in the 8-12 micron band, according to each of the polarizations.
Figure 5B:
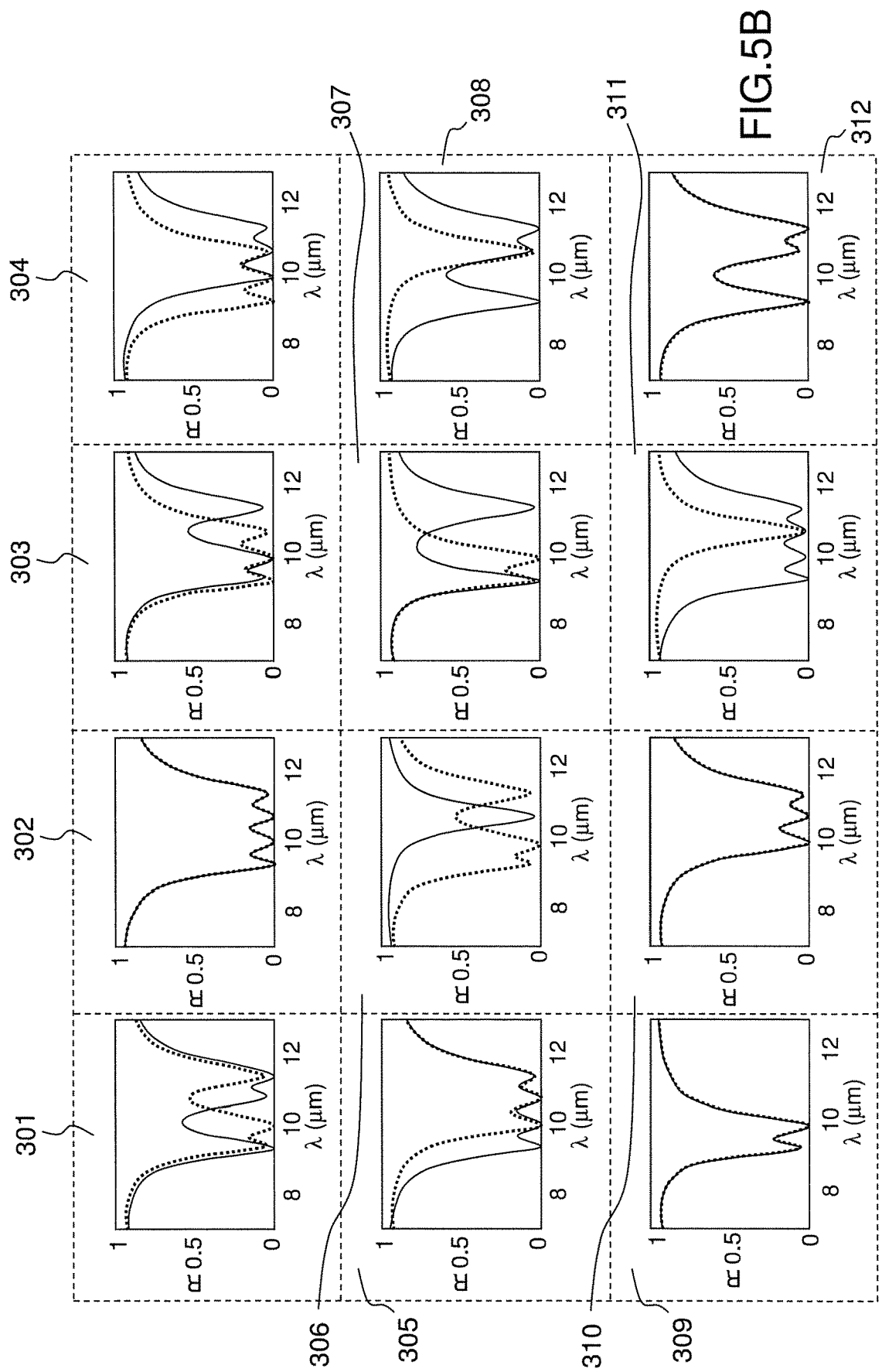

FIGS. 5A and 5B illustrate an example of an application of an encoding device 10 according to this description, allowing a first spectral encoding according to a first polarization and a second spectral encoding according to a second polarization, the device being intended to be observed in reflection in a given spectral band.

FIG. 5A shows the encoding device 10 seen from above; only the shapes of the elementary cells and the plasmonic nanoantennas arranged in each of the cells are represented. The encoding device is composed of 12 identical elementary cells 101-112, of a square shape, the size of which is adapted to the size of the pixel of the information that one seeks to encode. Plasmonic nanoantennas within each elementary cell are associated with responses according to each of the two polarizations. The horizontal nanoantennas (according to x) encode the TM polarization and the vertical antennas (according to y) encode the TE polarization. In this example, each plasmonic nanoantenna has a rectangular shape arranged in any of the two perpendicular directions. Each elementary cell can have up to 4 plasmonic nanoantennas of different lengths in one direction, which therefore have 4 different resonance wavelengths in the spectral band of observation.

The presence or absence of each of the nanoantennas of different lengths makes it possible to form, according to each polarization, $2^4=16$ different optical responses in the spectral band of observation, when the encoding device is observed in reflection or in emission. FIG. 5B thus illustrates the optical responses 301-312 as a function of the wavelength calculated for each elementary cell according to each of the TE and TM polarizations (the spectra are represented respectively by a solid line (TE) and by a dotted line (TM)).

Figure 6:
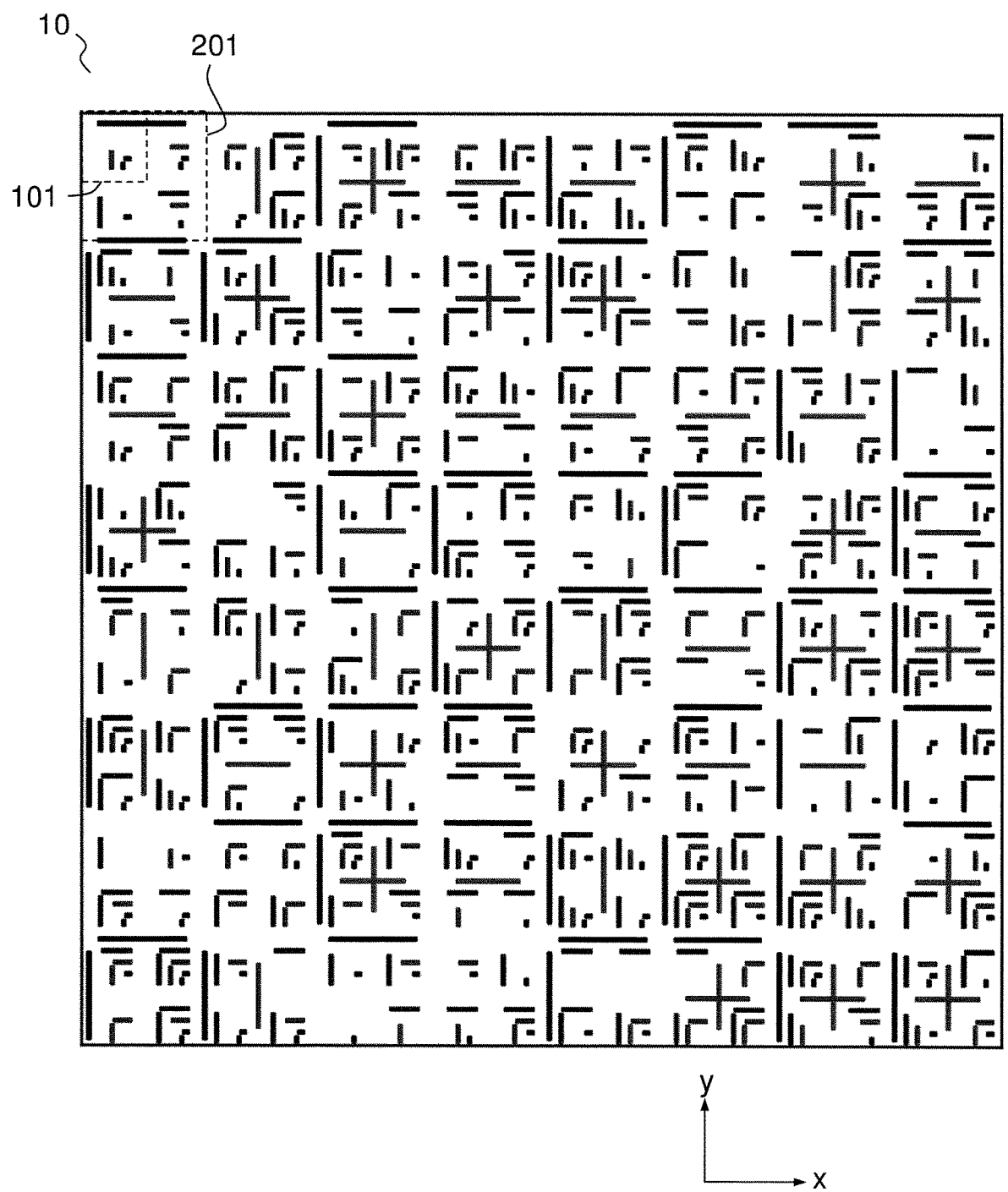
FIG. 6, an example of an encoding device according to this description formed of a set of elementary cells comprising resonant nanoantennas according to two orthogonal polarizations and arranged to encode a QR code, according to an embodiment of this description.
Figure 8A:
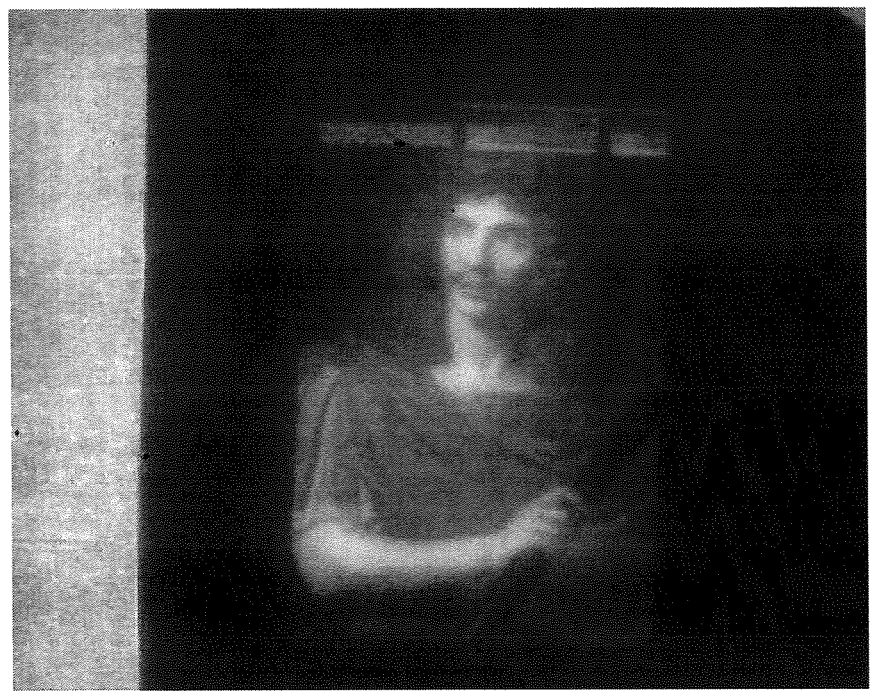
FIG. 8A, a first response, according to a first polarization and in a first spectral band, of an encoding device according to this description observed in emission, the encoding device comprising a set of elementary cells comprising resonant nanoantennas of two orthogonal polarizations and arranged to encode a first image of a polarization and a second image of a second polarization.
Figure 8B:
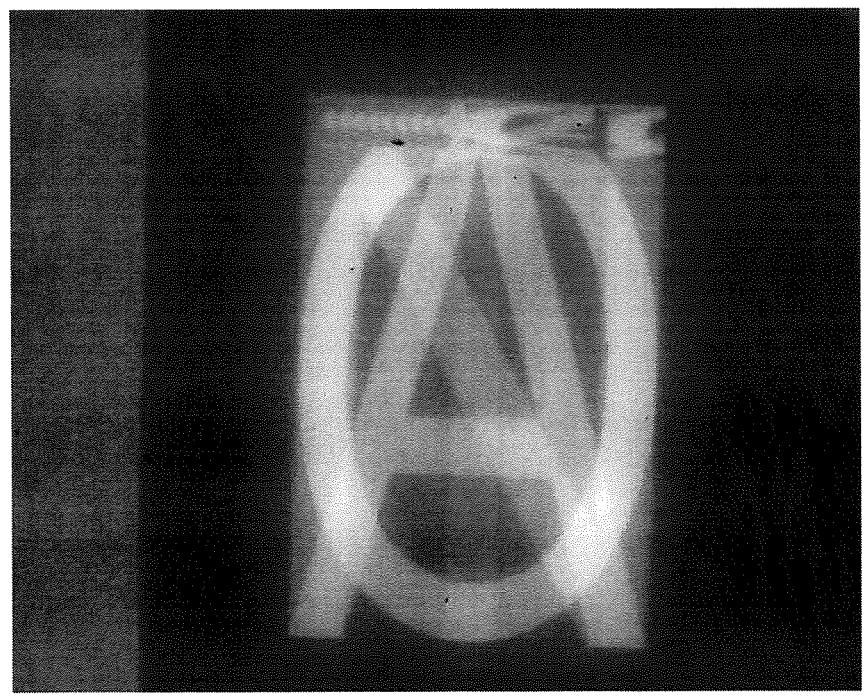
FIG. 8B, the optical response, of the second polarization and in the first spectral band, of the encoding device, a first response of which is illustrated in FIG. 8A, as observed in emission.
Figure 9A:
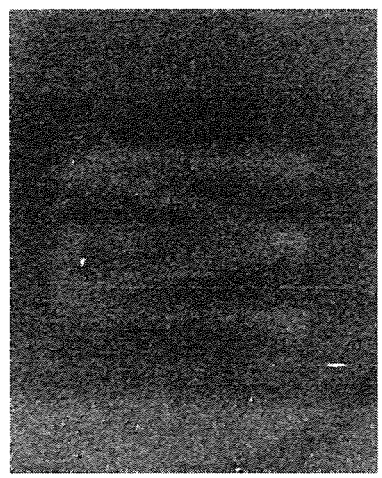
FIG. 9A to 9E, the optical responses, according to the second polarization and in spectral sub-bands of the first spectral band, of the encoding device, a first response of which is illustrated in FIG. 8A, as observed in emission.
Figure 9B:
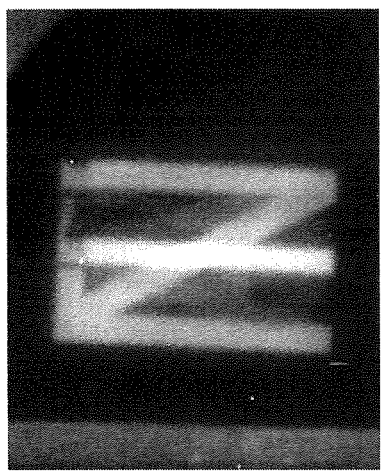
Figure 9C:
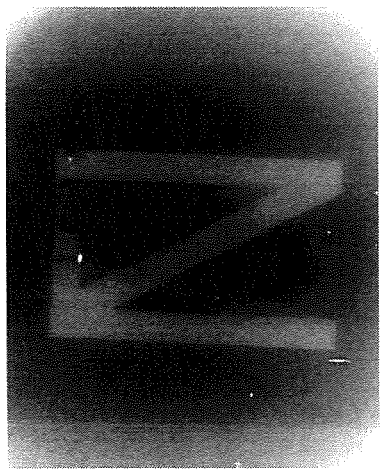
Figure 9D:
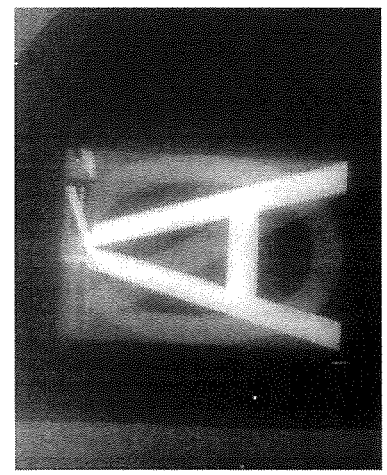
Figure 9E:
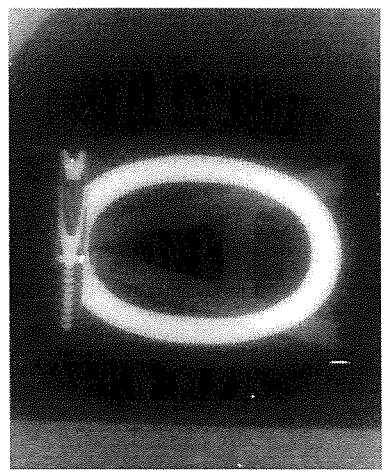

FIG. 6 represents an example of the encoding device 10 applied to the realization of a QR-type code (abbreviation of "Quick Response") or a two-dimensional barcode type code, in color, observable in two spectral bands (visible and infrared) and according to two polarizations (TE, TM). FIGS. 7A, 7B and 8A, 8B show the optical responses in each of the spectral bands.

FIG. 6 comprises a first set of elementary cells 100 and a second set of elementary cells 200, the elementary cells 200 each comprising a subset of elementary cells 100.

The elementary cells 100 are sized to form an optical response in the visible band, according to two orthogonal polarizations. Thus, each elementary cell comprises a first set of nanoantennas oriented in a first direction (for example parallelepiped-shaped nanoantennas) for encoding a first spatial unit of information according to a first polarization and a second set of nanoantennas oriented in a perpendicular direction for encoding a second spatial unit of information according to a second polarization. More precisely, the nanoantennas represented horizontally (according to x) in FIG. 6 encode the "vertical" polarization or TM and the nanoantennas represented vertically (according to y) in FIG. 6 encode the "horizontal" polarization (or TE). In this example, the encoding is a "color coding" as previously described. Thus, each nanoantenna can take a length from three lengths allowing resonant absorption at one of the three resonance wavelengths $\lambda_{r1}$, $\lambda_{r2}$ and $\lambda_{r3}$ located respectively in blue, green and red. In this example, each nanoantenna is either present or absent, which results in 8 possible combinations to form 8 colors, namely red, dark blue, green, white, black, pink, light blue and yellow, as this is illustrated in FIGS. 7A and 7B. The observation can be made using the naked eye, but also by using any camera/photographic equipment.

Elementary cells 200 are sized to form an optical response in the infrared band (around 2-3 µm), also according to two orthogonal polarizations. In this example, each elementary cell 200 comprises a first set of at most 2 nanoantennas oriented in a first direction for the encoding of a first spatial unit of information in the infrared band according to a first polarization and a second set of at most 2 nanoantennas oriented in a perpendicular direction for the encoding of a second spatial unit of information in the infrared according to a second polarization. In this example, the encoding is also a "color coding" as previously described. Each nanoantenna can take a length from two lengths allowing resonant absorption at one of the two resonance wavelengths $A_{r4}$, $A_{ry}$, located respectively in the band 2-3 µm. In this example, each nanoantenna is either present or absent, which results in 4 possible combinations for forming 4 colors as shown in FIGS. 7C and 7D. Observation can be done through a polarizer, using a standard infrared camera.

FIGS. 8A and 8B, 9A to 9E illustrate the emission observation of an encoding device according to this description. This is performed using rectangular parallelepiped plasmonic nanoantennas arranged on elementary cells measuring 30×30 microns. In this example, the substrate is silicon, the metal is gold, the dielectric formed of silica. The lower metal layer has a thickness of 200 nm (optically opaque layer). The thickness of the dielectric layer is 220 nm. The metal pads have a thickness of 50 nm. The antennas have widths of 100 nm and their lengths in one of the directions range between 900 and 1450 nm, in steps of 50 nm to encode 11 levels of gray in emission in one polarization and have 5 different lengths in the other direction. The temperature of the sample is 373° C. for an observable emission in the spectral band of 3-5 microns. In this example, a first image, "Molière" (FIG. 8A), is encoded according to a first polarization and a second image, formed by an overlay of the letters "M", "I", "N", "A", "O" is coded according to a second polarization. Thus, FIGS. 8A and 8B result from the emission observation of the heated device through two crossed polarizers. In these examples, the encoding of the "Molière" is done in grayscale, by modifying the length of the bar forming the plasmonic nanoantenna, which results in a displacement of the emission curve of the nanoantenna on the black body curve (see FIG. 2D) and thus a change in the optical response. The coding of all the letters is done in grayscale in 5 different spectral bands, centered respectively 3.20 microns, 3.71 microns, 4.22 microns, 4.73 microns, 5.24 microns. The grayscale is obtained for each letter by changing the length of each antenna. FIGS. 9A to 9E thus show the observation through filters respectively centered on each of the wavelengths.

Figure 10:
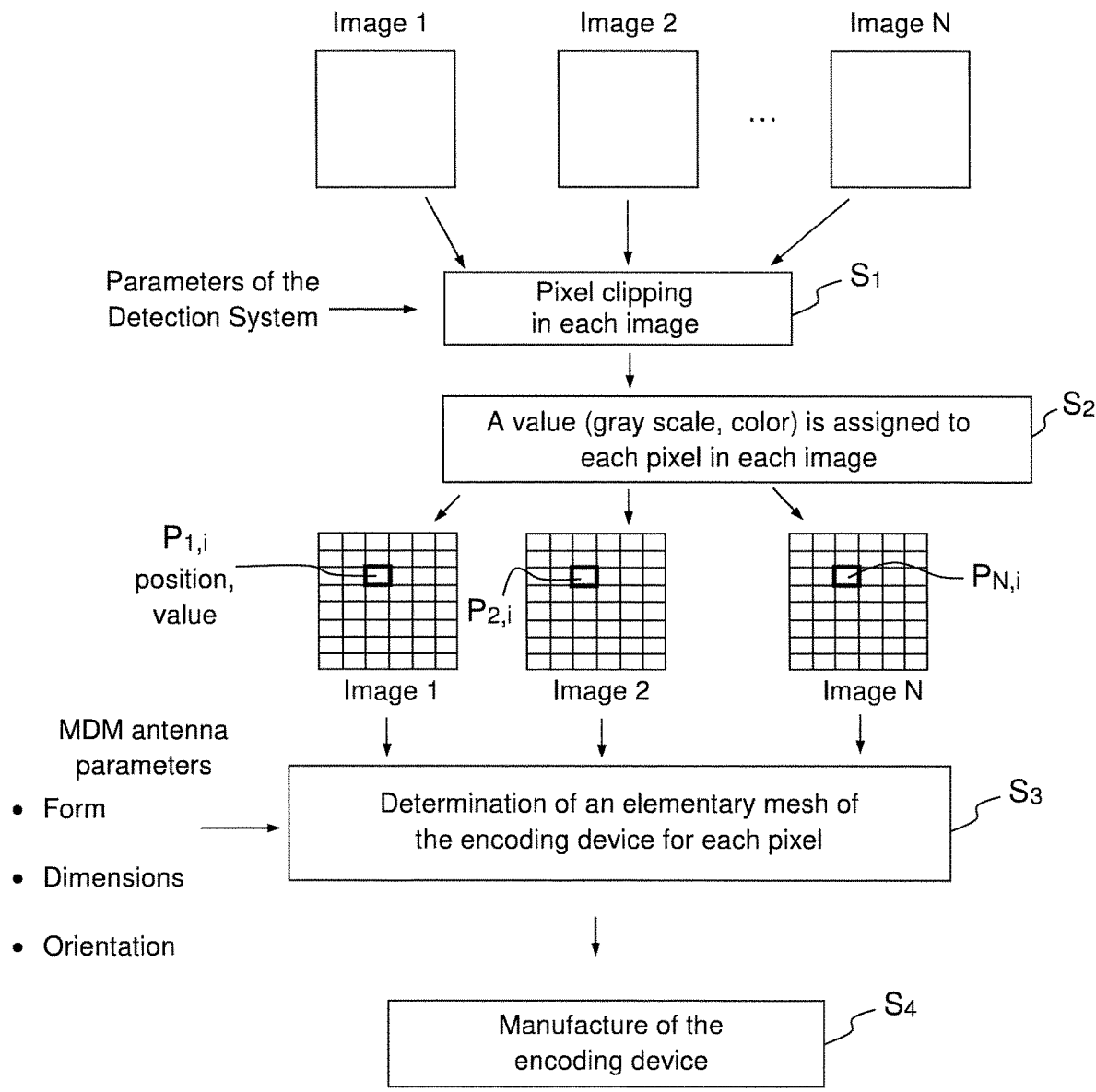
FIG. 10, the steps of an encoding method according to an example of this description.

For all of these examples, an encoding method as shown in FIG. 10 may be used.

FIG. 10 illustrates an example of an encoding method of at least one spatial unit of information or an "image" by means of an encoding device according to this description, for example an encoding device comprising plasmonic nanoantennas as described above. The spatial unit of information is for example a spatial unit of information forming a recognizable pattern (such as for example the "Molière" or the letters of FIGS. 8A and 8B), or spatial information forming a QR-type bar code as described by means of FIGS. 6 and 7A to 7D, or may be an image representative of one-dimensional spatial information, for example a one-dimensional bar code. In all cases, one seeks to adapt the encoding of the information to the authentication devices and in particular to the parameters of the detector (spectral detection band, pixel size) and the focusing optics (numerical aperture of the objective), for example as described in FIGS. 11A and 11B.

The image(s) are first cut into pixels or "pixelated" (step S1), the pixel size depends on the parameters of the detection systems. For each pixel $P_{j,i}$ of each image, where i is the position of the pixel in the index image j, is assigned a value which can be, as previously described, in grayscale in a given range of observation, or a "color", i.e., a set of multiple grayscale values for different wavelengths or ranges of wavelengths (step $S_2$). Then (step $S_3$) the elementary cell at position i is determined on the supporting structure of the encoding device which will make it possible to form the optical response(s) of a given value for each pixel, according to the encoding methods previously described. The last step (S4) then consists in manufacturing the encoding device, according to known manufacturing methods, for example metal deposition on a substrate, deposition of the dielectric layer, electronic lithography (but which can be replaced by UV or nanoimprint lithography) for the formation of metal pads, followed by a lift off (see for example Levesque et al. "Plasmonic planar antenna for wideband and efficient linear polarization conversion", Appl. Phys. Lett 104, 111105 (2014)).

Figure 11A:
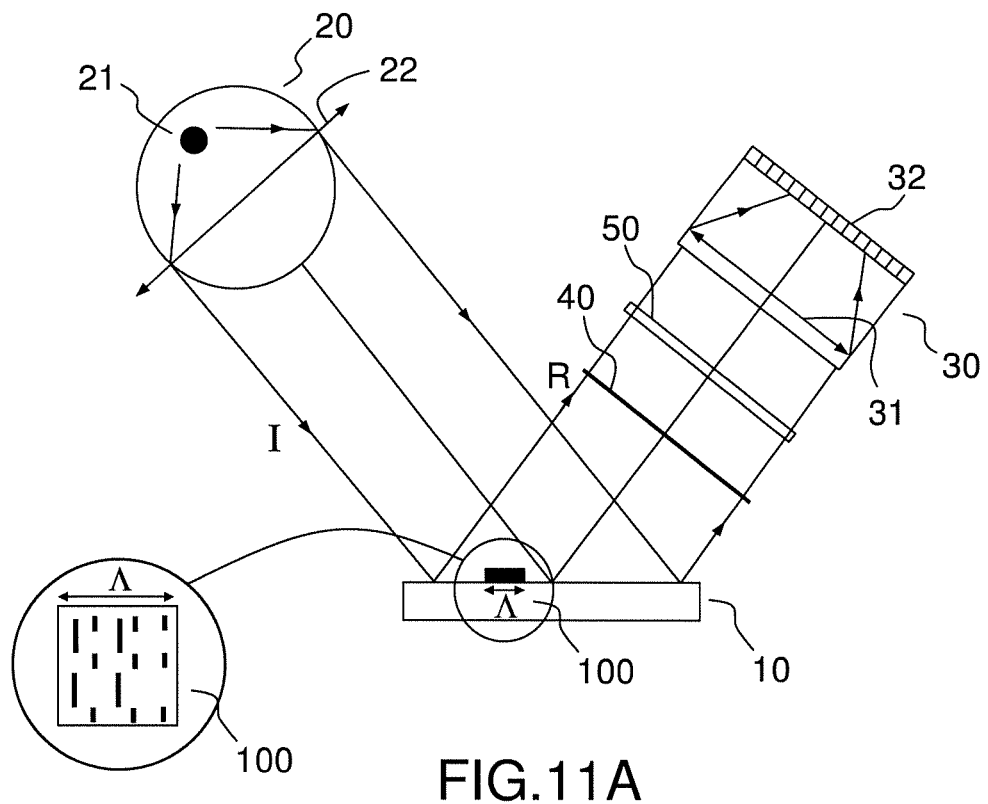
FIGS. 11A and 11B, two diagrams illustrating suitable devices for the authentication of a secured object respectively in reflection, with a light source, and in emission, with a means for heating.
Figure 11B:
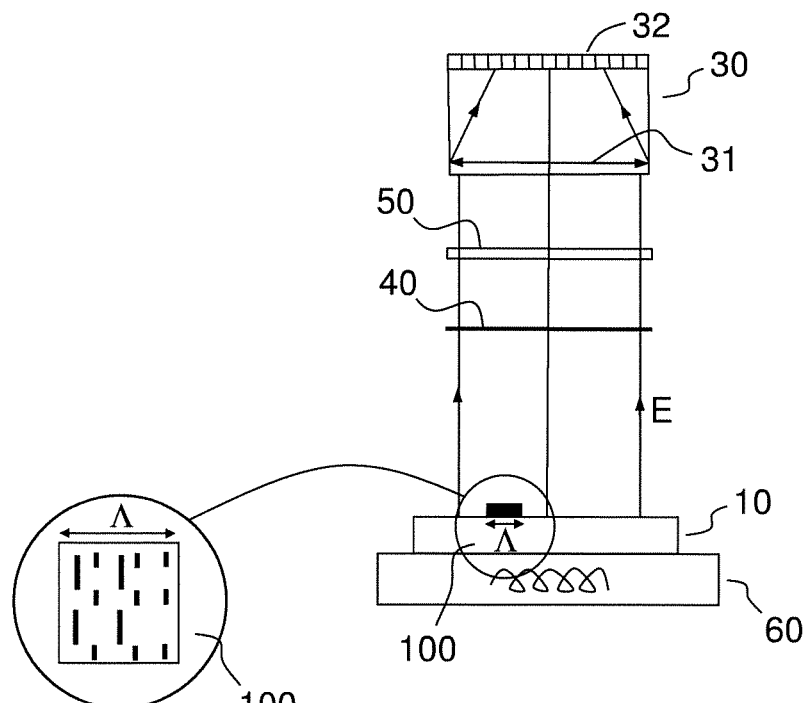

FIGS. 11A and 11B show two examples of devices for authentication of secured products by means of an encoding device according to this description, for an authentication respectively in reflection and in emission.

The authentication device shown in FIG. 11A is adapted to reflection authentication of an encoding device 10 according to this description. The encoding device 10 is for example integrated in an object to be secured (not shown). The authentication device comprises an emission means with a source of emission 20 for the emission of a collimated light beam I intended to illuminate the encoding device 10. The emission source comprises, for example, an emitter 21 and an optical collimation lens 22. The transmitter is adapted to the desired spectral band of observation. For example, the emitter is a visible light source or an infrared light source, for example one of the spectral bands 3-5 µm or 8-12 µm corresponding to atmospheric emission bands. The authentication device further comprises a detection channel with a detection system 30 for receiving a beam R resulting from the reflection of the illumination beam I by the encoding device. The detection system 30 comprises an optical focusing element 31 which can be formed for example of an objective, an optical lens or any combination of these elements, and a detector 32 for detection in the observation spectral band. The detector comprises for example a CCD or CMOS camera for observation in the visible band, with pixel sizes of 1 to 10 µm. In the infrared band, the detectors may comprise for example: microbolometer detectors (3-14 µm), MCT detectors (Band I—1.5-5 µm), InGaAs detectors (1-1.8 µm). The detection channel further comprises, in one or more embodiments, one or more polarizers 50 and one or more spectral filters 40. The detection system defines a "pixel size" limited by the opening of the focusing optics 31 or the size of an elementary detector of the detector 32. The pixel size is typically 1 to 10 μm in a visible detection system; it is limited by the diffraction limit, with an influence on the signal-to-noise ratio which decreases when the pixels become small. The pixel size is typically 15 μm in an infrared detection system but should drop to 10 μm for next-generation detectors.

The authentication device shown in FIG. 11B is adapted to emission authentication of an encoding device 10 according to this description. It comprises a detection channel substantially similar to that shown in FIG. 11A but no emission channel since it is the thermal emission of the encoding device which is measured and not the reflection of an incident optical wave. According to one or more embodiments, the authentication device comprises a heating means 60 enabling thermal emission at wavelengths in the conventional infrared detection bands.

In the visible band, the encoding devices can also be authenticated with the naked eye. Thus, with normal vision, an individual can distinguish patterns with an angular resolution of 1 minute of arc, which corresponds for an object observed at the punctum proximum (typically at a distance of 25 cms) to see pixels on the object that are between 7 and 8 μm. It is possible to go down to the visible diffraction limit with conventional devices (loupe, microscope).

Although described through a number of detailed embodiments, the encoding device and method according to this description comprise various alternatives, modifications, and enhancements that will be apparent to those skilled in the art, with the understanding that these different alternatives, modifications and enhancements are within the scope of the invention, as defined by the following Claims.

The invention claimed is:

1. An optical encoding device of an image formed of pixels each defined by a position and at least one value, the image comprising at least two pixels of different values, the encoding device being intended to be observed in at least a first spectral band of observation and comprising:
   a supporting structure; and
   a set of plasmonic nanoantennas of the metal-dielectric-metal type formed on said supporting structure, wherein:
      each plasmonic nanoantenna is resonant to at least one wavelength comprised in said first spectral band of observation,
      the plasmonic nanoantennas are arranged spatially on the supporting structure so that at one pixel of the image, a subset of one or more plasmonic nanoantenna(s) is associated, whose optical response according to a polarization and in a spectral band comprised in the first spectral band of observation corresponds to the value of said pixel, the set of plasmonic nanoantennas thus forming at least a first spatial coding of said image in said first spectral band of observation.

2. The encoding device according to claim 1, wherein at least a first spatial encoding comprises a grayscale coding, said optical response of a subset of one or more plasmonic nanoantenna(s) associated with a pixel having a relative intensity in a scale of intensities corresponding to a pixel value defined by a gray level in a scale of gray levels.

3. The encoding device according to claim 1, in which a pixel of the image having at least a first and a second value, a subset of nanoantennas is associated with each pixel of the image, wherein said subset of nanoantennas has, according to a given polarization, at least a first and a second optical responses respectively in a first and second spectral bands comprised in the first spectral band of observation, the first and second optical responses corresponding to the first and second values of the pixel, thus forming a spatial color coding of the image in said first spectral band of observation.

4. The encoding device according to claim 1, wherein:
   the set of plasmonic nanoantennas comprises resonant plasmonic nanoantennas in a first spectral band of observation and resonant plasmonic nanoantennas in a second spectral band, and
   the resonant plasmonic nanoantennas in the first spectral band are arranged spatially on the substrate so as to form a first spatial encoding of a first image, observable in the first spectral band of observation, and the resonant plasmonic nanoantennas in the second spectral band are arranged spatially on the substrate so as to form a second spatial encoding of a second image, observable in the second spectral band of observation.

5. The encoding device according to claim 1, wherein:
   the set of plasmonic nanoantennas comprises resonant plasmonic nanoantennas according to a first polarization and resonant plasmonic nanoantennas according to a second polarization, and
   the resonant plasmonic nanoantennas according to the first polarization are arranged spatially on the substrate in such a way as to form a first spatial encoding of a first image, observable in said first spectral band of observation according to the first polarization, and the resonant plasmonic nanoantennas according to the second polarization are arranged spatially on the substrate so as to form a second spatial encoding of a second image, observable in said first spectral band of observation according to the second polarization.

6. The encoding device according to claim 1, wherein the plasmonic nanoantennas are distributed in elementary cells of similar shapes and dimensions, each elementary cell comprising a subset of one or more plasmonic nanoantennas having an optical response corresponding to a value of one pixel of the image.

7. The encoding device according to claim 6, wherein the plasmonic antennas are distributed according to first elementary cells of similar shapes and dimensions, each of the first elementary cells comprising a subset of one or more plasmonic nanoantenna(s) presenting an optical response in a first spectral band of observation corresponding to a value of one pixel of a first image, and wherein the first elementary cells are distributed in second elementary cells of similar shapes and dimensions, each of the second elemental cells comprising a subset of one or more plasmonic nanoantenna(s) having an optical response in a second spectral band of observation corresponding to a value of one pixel of a second image.

8. The encoding device according to claim 1, wherein the plasmonic nanoantennas are spatially distributed on the substrate to encode in a first spectral band of observation and according to a given polarization, at least a first image forming a QR code.

9. The encoding device according to claim 1, wherein the plasmonic nanoantennas are spatially arranged on the substrate to encode in a first spectral band of observation and according to a given polarization, at least a first image forming a recognizable pattern.

10. The encoding device according to claim 1, wherein all the plasmonic nanoantennas comprise:
- a first continuous metal layer;
- a second continuous layer of dielectric material formed on the first continuous metal layer; and
- a third metal layer arranged on the second continuous dielectric material layer and structured to locally form metal-dielectric-metal stacks ($MDM_i$) forming said plasmonic nanoantennas.

11. The encoding device according to claim 10, further comprising a substrate forming the supporting structure on which is deposited the first continuous metal layer.

12. The encoding device according to claim 10, wherein the supporting structure is formed by the first continuous metal layer or by the second layer of dielectric material.

13. A secured object comprising:
- an encoding device of an image formed of pixels each defined by a position and at least one value, the image comprising at least two pixels of different values, the encoding device being configured to be observed in at least a first spectral band of observation and comprising:
  - a supporting structure, and
  - a set of plasmonic nanoantennas of the metal-dielectric-metal type formed on said supporting structure, wherein:
  - each plasmonic nanoantenna is resonant to at least one wavelength comprised in said first spectral band of observation,
  - the plasmonic nanoantennas are arranged spatially on the supporting structure so that at one pixel of the image, a subset of one or more plasmonic nanoantenna(s) is associated, whose optical response according to a polarization and in a spectral band comprised in the first spectral band of observation corresponds to the value of said pixel, the set of plasmonic nanoantennas thus forming at least a first spatial coding of said image in said first spectral band of observation.

14. An encoding method in at least a first spectral band of observation of at least one image, the method being performed by an encoding device of an image formed of pixels each defined by a position and at least one value, the image comprising at least two pixels of different values, the encoding device being configured to be observed in at least a first spectral band of observation and comprising:
- a supporting structure, and
- a set of plasmonic nanoantennas of the metal-dielectric-metal type formed on said supporting structure, wherein:
- each plasmonic nanoantenna is resonant to at least one wavelength comprised in said first spectral band of observation, the plasmonic nanoantennas are arranged spatially on the supporting structure so that at one pixel of the image, a subset of one or more plasmonic nanoantenna(s) is associated, whose optical response according to a polarization and in a spectral band comprised in the first spectral band of observation corresponds to the value of said pixel, the set of plasmonic nanoantennas thus forming at least a first spatial coding of said image in said first spectral band of observation, the method comprising:
- decomposition of the image into pixels, each pixel having a position in the image;
- assignment of a value of at least one pixel to each pixel;
- for each pixel, determination of a subset of one or more plasmonic nanoantenna(s) whose optical response according to a polarization and in a spectral band comprised in the spectral band of observation corresponds to the value of the pixel; and
- production of the metal-dielectric-metal structures on the supporting structure to form all the nanoantennas.

* * * * *